(12) United States Patent
Li et al.

(10) Patent No.: US 12,495,612 B2
(45) Date of Patent: Dec. 9, 2025

(54) DISPLAY SUBSTRATE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ting Li, Beijing (CN); Zhengdong Zhang, Beijing (CN); Pengcheng Zang, Beijing (CN); Yadong Zhang, Beijing (CN); Zheng Liao, Beijing (CN); Ze Zhao, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/030,809

(22) PCT Filed: Jun. 24, 2022

(86) PCT No.: PCT/CN2022/101070
§ 371 (c)(1),
(2) Date: Apr. 7, 2023

(87) PCT Pub. No.: WO2023/245610
PCT Pub. Date: Dec. 28, 2023

(65) Prior Publication Data
US 2024/0371888 A1  Nov. 7, 2024

(51) Int. Cl.
*G09G 5/00* (2006.01)
*G09G 3/36* (2006.01)
(Continued)

(52) U.S. Cl.
CPC .......... *H10D 86/60* (2025.01); *G09G 3/3648* (2013.01); *H10D 86/441* (2025.01);
(Continued)

(58) Field of Classification Search
CPC ............... G09G 3/2092; G09G 3/3648; G09G 2300/0426; G09G 2320/0223;
(Continued)

(56) References Cited

U.S. PATENT DOCUMENTS 10,354,578 B2   7/2019  Ka et al.
10,367,052 B2   7/2019  Zhang et al.
(Continued)

FOREIGN PATENT DOCUMENTS

CN   107301831 A   10/2017
CN   107705756 A    2/2018
(Continued)

*Primary Examiner* — Joe H Cheng
(74) *Attorney, Agent, or Firm* — Scully, Scott, Murphy & Presser, P.C.

(57) ABSTRACT

A display substrate and a display device are provided. The display substrate includes a base substrate, sub-pixels, signal lines and signal line connection lines. The base substrate includes a first region and a second region, and a number of the sub-pixels along a first direction in the first region is larger than a number of the sub-pixels along the first direction in the second region. The signal line connection lines are electrically connected with the signal lines located in the second region. The display substrate further includes overlapping traces disposed at intervals and located in a layer different from that of the signal line connection lines. An orthographic projection of at least one of the signal line connection lines on the base substrate is completely within an orthographic projection of at least one of the overlapping traces on the base substrate.

20 Claims, 11 Drawing Sheets

(51) Int. Cl.
   *H10D 86/40*   (2025.01)
   *H10D 86/60*   (2025.01)
   *G02F 1/1362*   (2006.01)

(52) U.S. Cl.
   CPC ................ *G02F 1/136286* (2013.01); *G09G 2300/0426* (2013.01); *G09G 2320/0223* (2013.01)

(58) Field of Classification Search
   CPC ............ G02F 1/1362; G02F 1/136286; H10D 86/441; H10D 86/60
   See application file for complete search history.

(56) References Cited

U.S. PATENT DOCUMENTS

| | | | |
|---|---|---|---|
| 10,559,253 B1* | 2/2020 | Li | ................ H10K 59/131 |
| 2018/0342572 A1 | 11/2018 | Park et al. | |
| 2019/0005915 A1* | 1/2019 | Liu | ................ G09G 5/003 |
| 2020/0058242 A1* | 2/2020 | Liu | ................ G09G 3/3677 |
| 2020/0194461 A1* | 6/2020 | Park | ................ H10D 86/411 |
| 2021/0384279 A1 | 12/2021 | Li et al. | |
| 2023/0029861 A1 | 2/2023 | Zhou et al. | |
| 2024/0389382 A1* | 11/2024 | Wang | ................ H10K 59/131 |

FOREIGN PATENT DOCUMENTS

| | | |
|---|---|---|
| CN | 107966864 A | 4/2018 |
| CN | 108598139 A | 9/2018 |
| CN | 109521594 A | 3/2019 |
| CN | 209560243 U | 10/2019 |
| CN | 110459572 A | 11/2019 |
| CN | 111108432 A | 5/2020 |
| CN | 214043667 U | 8/2021 |
| CN | 214542236 U | 10/2021 |
| CN | 114429959 A | 5/2022 |
| KR | 20190047918 A | 5/2019 |
| KR | 20200046800 A | 5/2020 |

* cited by examiner

DISPLAY SUBSTRATE AND DISPLAY DEVICE

CROSS-REFERENCE TO RELATED APPLICATION

This application is a U.S. National Phase of International Application No. PCT/CN2022/101070 filed on Jun. 24, 2022, the entire disclosure of which is incorporated herein by reference as part of the present application.

TECHNICAL FIELD

Embodiments of the disclosure relate to a display substrate and a display device.

BACKGROUND

Currently, in more and more mobile phone products, the display region has a special shape. For example, an opening is disposed in the display region or the display region has a triangle-like shape etc. A camera and a photosensitive device etc. can be disposed in the above opening or disposed in a region outside the display region with triangle-like shape, to have a smooth and good appearance while improving a screen ratio of a display screen.

SUMMARY

The disclosure provides a display substrate and a display device. The display substrate includes: a base substrate, comprising a first region and a second region in the periphery of the first region; a plurality of sub-pixels, located in the first region and the second region, wherein a number of the sub-pixels along a first direction in the first region is larger than a number of the sub-pixels along the first direction in the second region; a plurality of signal lines, located in the first region and the second region, wherein each of the signal lines at least partially extends along the first direction, and each of the signal lines is electrically connected with a line of the sub-pixels arranged along the first direction; a plurality of signal line connection lines, located in the second region, wherein the plurality of signal line connection lines are configured to be electrically connected with the signal lines located in the second region, and each of the signal line connection lines at least partially extends along the first direction, wherein the display substrate further comprises a plurality of overlapping traces in the second region, wherein the plurality of overlapping traces are disposed at intervals and are located in a layer different from that of the plurality of signal line connection lines, an orthographic projection of at least one of the plurality of signal line connection lines on the base substrate is completely within an orthographic projection of at least one of the plurality of overlapping traces on the base substrate.

For example, according to an embodiment of the disclosure, the plurality of signal lines comprises at least one of a plurality of gate lines and a plurality of data lines.

For example, according to an embodiment of the disclosure, an extension direction of the overlapping traces is the same as an extension direction of the signal line connection lines, and a line width of the overlapping traces is larger than or equal to a line width of the signal line connection lines.

For example, according to an embodiment of the disclosure, the plurality of overlapping traces are disposed in one-to-one correspondence with the plurality of signal line connection lines, respectively, an orthographic projection of each of the signal line connection lines on the base substrate is completely within an orthographic projection of the overlapping trace disposed correspondingly on the base substrate, and an interval between adjacent overlapping traces is not less than 1.5 micrometers.

For example, according to an embodiment of the disclosure, the signal line connection lines are disposed in a same layer as the signal lines electrically connected thereto.

For example, according to an embodiment of the disclosure, the overlapping traces are located on a side of the signal line connection lines away from the base substrate.

For example, according to an embodiment of the disclosure, the plurality of signal lines comprises a plurality of gate lines, and the display substrate further comprises: a plurality of data lines, located on a side of the plurality of gate lines away from the base substrate, and each of the data lines at least partially extends along the second direction, and the second direction intersects with the first direction, wherein, along a direction perpendicular to the base substrate, the data lines do not overlap with the signal line connection lines, the overlapping traces are disposed in a same layer as the data lines; or, the overlapping traces are located on a side of the data lines away from the base substrate.

For example, according to an embodiment of the disclosure, the signal line connection lines are disposed in a layer different from that of the signal lines electrically connected thereto.

For example, according to an embodiment of the disclosure, the plurality of signal lines comprises a plurality of gate lines, and the display substrate further comprises: a plurality of data lines, located on a side of the plurality of gate lines away from the base substrate, and each of the data lines at least partially extends along the second direction, and the second direction intersects with the first direction, wherein, along a direction perpendicular to the base substrate, the data lines do not overlap with the signal line connection lines, and the signal line connection lines are disposed in a same layer as the data lines.

For example, according to an embodiment of the disclosure, the overlapping traces are located in a same layer as the gate lines, or the overlapping traces are located on a side of the signal line connection lines away from the base substrate.

For example, according to an embodiment of the disclosure, the overlapping traces comprise a first overlapping trace and a second overlapping trace respectively located on both sides of the signal line connection lines in a direction perpendicular to the base substrate; in the direction perpendicular to the base substrate, the first overlapping trace overlaps with the second overlapping trace, and an orthographic projection of the signal line connection lines on the base substrate is located within an orthographic projection of at least one of the first overlapping trace and the second overlapping trace on the base substrate.

For example, according to an embodiment of the disclosure, the plurality of signal lines comprises a plurality of gate lines, and the display substrate further comprises: a plurality of data lines, located on a side of the plurality of gate lines away from the base substrate, and each of the data lines at least partially extends along the second direction, and the second direction intersects with the first direction, wherein the sub-pixel comprises a common electrode, located on a side of the data lines away from the base substrate, along a direction perpendicular to the base substrate, the data lines do not overlap with the signal line connection lines, the signal line connection lines are disposed in a same layer as the data lines, one of the first overlapping trace and the second overlapping trace is located in a same layer as the gate lines, and another of the first overlapping trace and the second overlapping trace is located in a same layer as the common electrode.

For example, according to an embodiment of the disclosure, the display substrate comprises a display region and a non-display region, the second region comprises a portion of the display region and a portion of the non-display region, and the signal line connection lines are at least partially located in the non-display region.

For example, according to an embodiment of the disclosure, the signal line connection line is electrically connected with the signal line located at least one side of the signal line connection line in the first direction, at least one capacitance compensation structure is disposed between the signal line connection line and the signal line electrically connected thereto, the capacitance compensation structure is located in the non-display region, and the capacitance compensation structure is electrically connected with both of the signal line and the signal line connection line respectively located on both sides of the capacitance compensation structure.

For example, according to an embodiment of the disclosure, the plurality of signal lines comprises a plurality of gate lines, and the display substrate further comprises: a plurality of data lines, located on a side of the plurality of gate lines away from the base substrate, and each of the data lines at least partially extends along the second direction, and the second direction intersects with the first direction, the sub-pixel comprises a common electrode, located on a side of the data lines away from the base substrate, in the first region, a value of capacitance generated by the gate line electrically connected with a row of sub-pixels and the data line and the common electrode which overlap with the gate line is a first capacitance value; in the second region, a sum value of a capacitance generated by the gate line electrically connected with a row of sub-pixels and the data line and the common electrode which overlap with the gate line, and a capacitance generated by a signal line connection line electrically connected with the gate line and the overlapping trace which overlap with the signal line connection line, and a capacitance of the capacitance compensation structure is a second capacitance value, and a ratio of the second capacitance value to the first capacitance value is from 0.85 to 1.

For example, according to an embodiment of the disclosure, at least one signal line connection line extends along a portion of an edge of the second region away from the first region.

For example, according to an embodiment of the disclosure, the non-display region in the second region comprises a first sub-region and a second sub-region, the second sub-region is located between the first sub-region and the display region, the signal line connection line is located in the first sub-region, and the capacitance compensation structure is located in the second sub-region.

For example, according to an embodiment of the disclosure, the sub-pixel comprises a common electrode located on a side of the signal line away from the base substrate, wherein the display substrate further comprises a common electrode line located on the base substrate, the common electrode line is configured to be electrically connected with the common electrode, and the common electrode line is electrically connected with the overlapping trace.

For example, according to an embodiment of the disclosure, a portion of the common electrode line located in the second region is disposed in a same layer as the overlapping trace, and the portion of the common electrode line is located between the overlapping trace and the display region, and the overlapping trace is integrally disposed with the portion of the common electrode line.

For example, according to an embodiment of the disclosure, a portion of the common electrode line located in the second region and the overlapping trace are located in different layers, and an insulation layer is disposed between the portion of the common electrode line and the overlapping trace, and the overlapping trace is electrically connected with the portion of the common electrode line through a via hole located in the insulation layer.

For example, according to an embodiment of the disclosure, the display substrate further comprises: a connection line, an extension direction of which intersecting with an extension direction of the overlapping trace; wherein the connection line is configured to electrically connect the overlapping trace with the portion of the common electrode line located in the second region; the connection line is disposed in a same layer with the overlapping trace.

For example, according to an embodiment of the disclosure, the display region in the second region comprises two sub-display regions arranged along the first direction, and an interval is disposed between the two sub-display regions so that an edge of the second region away from the first region forms a notch; the display substrate comprises a sealing region located in the non-display region, and the sealing region is configured to be disposed with a sealant; the signal line connection line comprises a portion located between the two sub-display regions and located in the sealing region, and the signal line connection line is configured to connect the signal lines located in the two sub-display regions respectively.

For example, according to an embodiment of the disclosure, the at least one signal line connection line extends along at least a portion of an edge of the notch.

The disclosure provides a display apparatus, comprising a display substrate according to any items as mentioned above.

BRIEF DESCRIPTION OF DRAWINGS

In order to clearly illustrate the technical solution of the embodiments of the present disclosure, the drawings of the embodiments will be briefly described in the following. It is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the disclosure, words such as "first", "second" and the like do not denote any order, quantity, or importance, but rather are used for distinguishing different components. Similarly, words such as "include" or "comprise" and the like denote that elements or objects appearing before the words of "include" or "comprise" cover the elements or the objects enumerated after the words of "include" or "comprise" or equivalents thereof, not exclusive of other elements or objects.

The features such as "parallel", "vertical" and "identical" and the like used in the embodiment of the disclosure all include the features such as "parallel", "vertical" and "identical" and the like in the strict sense, and the situations such as "substantially parallel", "substantially vertical" and "substantially identical" and the like contain certain errors. Considering the measurement and the errors related to the measurement of a specific quantity (for example, the limitation of the measurement system), it indicates it is within the acceptable deviation range for a specific value determined by a person of ordinary skill in the art. For example, "substantially" can indicate it is within one or more standard deviations, or within 10% or 5% of the stated value. When a number of components is not specified in the following of the embodiment of the disclosure, it indicates that the component can be one or more, or can be understood as at least one. "At least one" indicates one or more, and "a plurality of" indicates at least two. The "disposed in a same layer" in the disclosure indicates two (or more) structures is formed by the same deposition process and patterned by the same patterning process, and their materials can be the same or different. The "integrated structure" in the disclosure indicates two (or more) structures which are connected with each other and are formed by the same deposition process and patterned by the same patterning process, and their materials can be the same or different.

Figure 1:
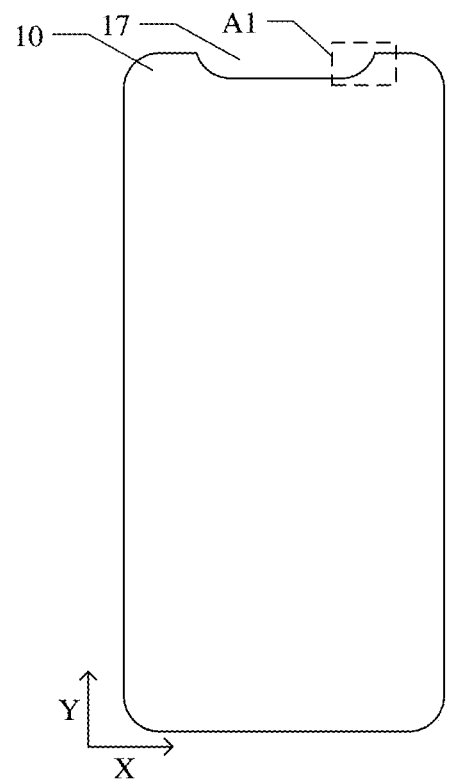
FIG. 1 is a schematic diagram of a display substrate.
Figure 2:
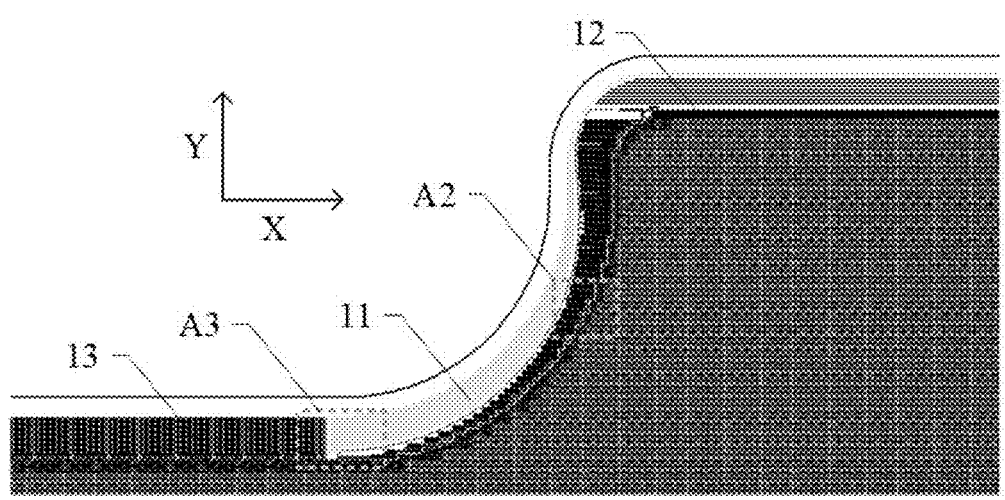
FIG. 2 is a partial enlarged schematic view of the region A1 as illustrated in FIG. 1.
Figure 3:
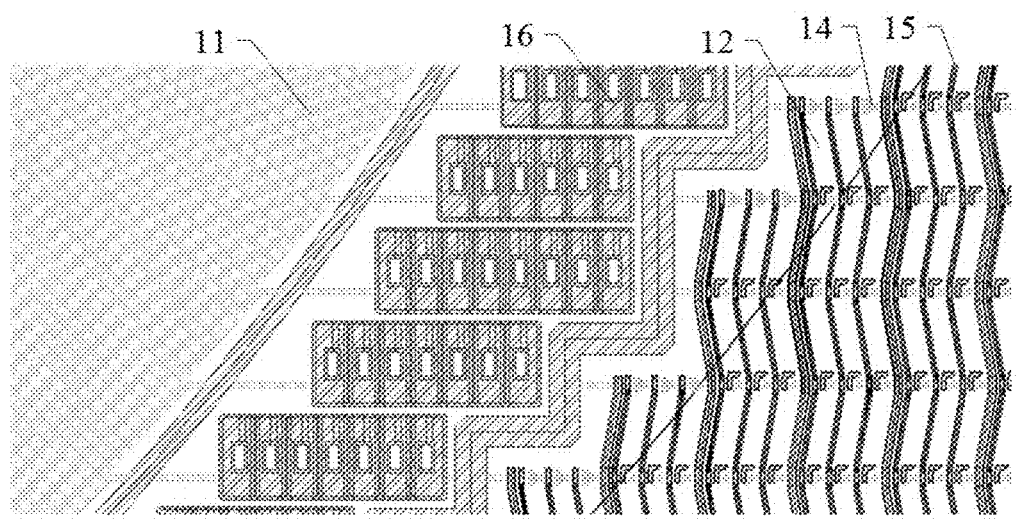
FIG. 3 is a partial enlarged schematic view of the region A2 as illustrated in FIG. 2.
Figure 4:
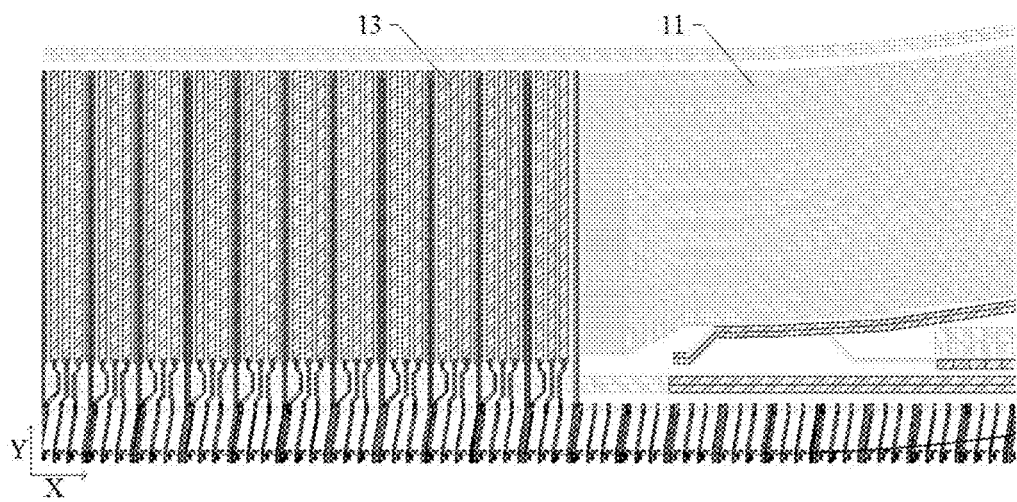
FIG. 4 is a partial enlarged schematic view of the region A3 as illustrated in FIG. 2.

FIG. 1 is a plan schematic diagram of a display substrate, FIG. 2 is a partial enlarged schematic diagram of the region A1 as illustrated in FIG. 1, FIG. 3 is a partial enlarged schematic diagram of the region A2 as illustrated in FIG. 2, and FIG. 4 is a partial enlarged schematic diagram of the region A3 as illustrated in FIG. 2. As illustrated in FIGS. 1 to 4, the display substrate 10 comprises a display region with special shape. A side of the display region with special shape is disposed with a notch 17. The display region with special shape is disposed with a plurality of sub-pixels 12 located on a base substrate therein. An example in which X direction is a row direction and Y direction is a column direction is illustrated, and the display regions located on both sides of the notch in the X direction can be a first display region and a second display region, respectively. Gate lines 14 electrically connected with the sub-pixels 12 located in the first display region and the second display region and distributed in a same row are electrically connected by a gate line connection line 11. For example, the gate line connection line 11 and the gate lines 14 can be traces disposed in a same layer. For example, the gate line connection line 11 and the gate lines 14 can be integrally disposed.

As illustrated in FIGS. 1 to 4, a number of a row of sub-pixels 12 disposed in the first display region and the second display region on both sides of the notch 17 in the X direction is less than a number of a row of sub-pixels 12 disposed in the display region (for example, a third display region) on a side of the notch 17 in the Y direction. A capacitance value of the capacitance generated between the gate line 14 and the gate line connection line 11 electrically connected with the same row of sub-pixels 12 in the first display region and the second display region and other conductive layers (for example, the conductive layer where the data line is located and the conductive layer where the common electrode is located) is C01, and a capacitance value of the capacitance generated between the gate line electrically connected with a row of sub-pixels 12 in the third display region and other conductive layers (for example, the conductive layer where the data line is located and the conductive layer where the common electrode is located) is C02. In order to reduce a difference between C01 and C02, a capacitance compensation structure 16 can be disposed between the gate line connection line 11 and the sub-pixel 12 in the first display region or the second display region, and/or a plurality of cover strips 13 extending in the Y direction can be disposed on a side of a portion of the gate line connection line 11 away from the base substrate, the portion of the gate line connection line being in the third display region and close to the notch 17. The capacitance C03 is obtained by compensating the capacitance C01 in the above manners.

In the research, the inventors of the application found that a white deviation in the low grey level appears when the first display region display an image in the case that a ratio of the capacitance value C03 to the capacitance value C02 is less than 70%.

Embodiments of the disclosure provide a display substrate and a display device. The display substrate comprises a base substrate, a plurality of sub-pixels, a plurality of signal lines and a plurality of signal line connection lines on the base substrate. The display substrate comprises a first region and a second region in the periphery of the first region; the plurality of sub-pixels are located in the first region and the second region, a number of the sub-pixels arranged along a first direction in the first region is larger than a number of the sub-pixels arranged along the first direction in the second region; the plurality of signal lines are located in the first region and the second region, and each of the signal lines at least partially extends along the first direction, and each of the signal lines is electrically connected with a line of sub-pixels arranged along the first direction; the plurality of signal line connection lines are located in the second region, the plurality of signal line connection lines are configured to be connected with the signal lines located in the second region, and each of the signal line connection lines at least partially extends along the first direction; the display substrate further comprises a plurality of overlapping traces in the second region, the plurality of overlapping traces are disposed at intervals and are located in a layer different from that of the plurality of signal lines, and an orthographic projection of at least one of the plurality of signal line connection lines on the base substrate is completely within an orthographic projection of at least one of the plurality of overlapping traces on the base substrate.

In the display substrate according to the disclosure, the orthographic projection of the signal line connection line on the base substrate is completely within the orthographic projection of the overlapping trace on the base substrate, which can increase an overlap area of the signal line connection line and the overlapping trace as much as possible on the premise of satisfying the light transmittance of the metal layer in the display substrate directly opposing to the sealant, so that the resistance-capacitance load (RC load) on the signal line in the second region of the display substrate with special shape can be compensated in maximum to avoid that a low gray scale image is displayed unevenly in the display substrate with special shape as much as possible.

Hereinafter, the display substrate and the display device according to embodiments of the disclosure are described in connection with the drawings.

Figure 5:
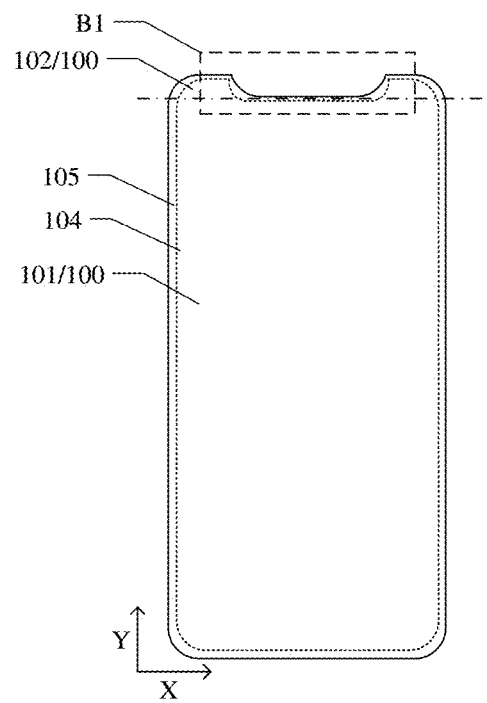
FIG. 5 is a whole schematic view of a display substrate according to an embodiment of the disclosure.
Figure 6:
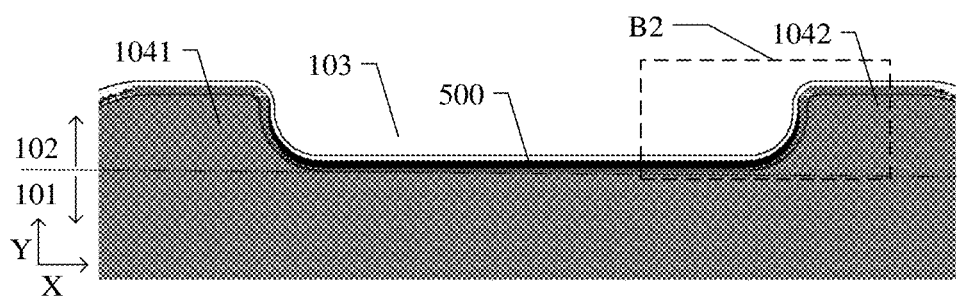
FIG. 6 is a partial enlarged view of the region B1 as illustrated in FIG. 5.
Figure 7:
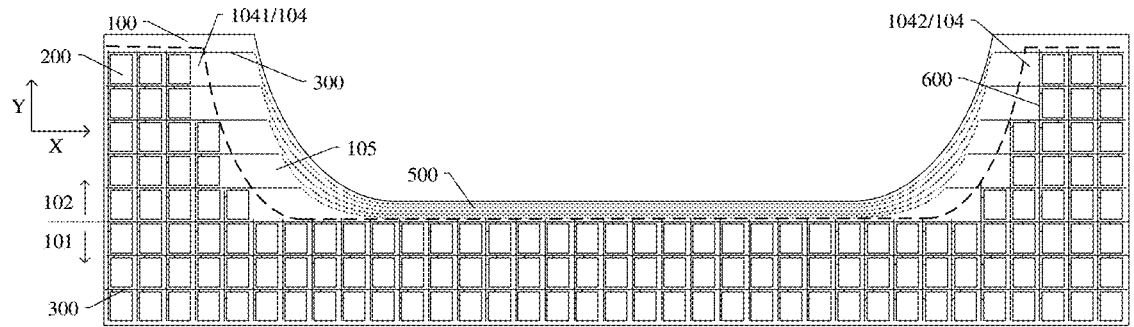
FIGS. 7 and 8 are schematic views of the structure as illustrated in FIG. 6.
Figure 8:
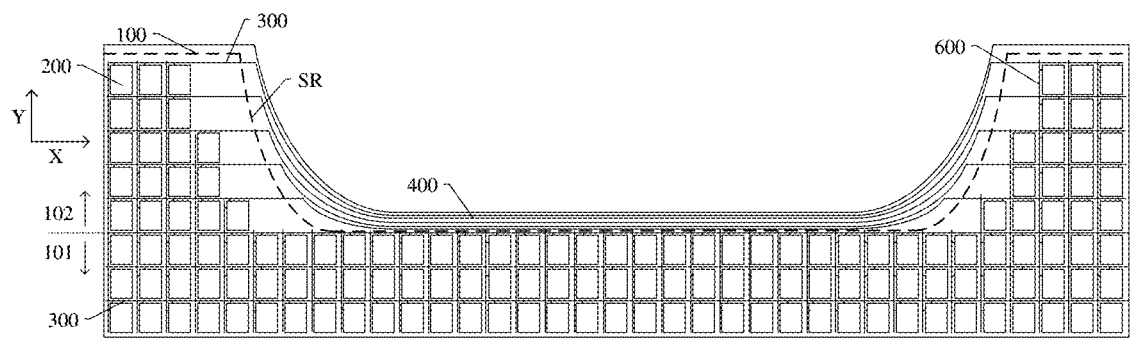

FIG. 5 is a whole contour view of a display substrate according to an embodiment of the disclosure, FIG. 6 is a partial enlarged view of the region B1 as illustrated in FIG. 5 and FIGS. 7 and 8 are schematic views of the structure as illustrated in FIG. 6.

As illustrated in FIGS. 5 to 8, the display substrate comprises a base substrate 100 and a plurality of sub-pixels 200, a plurality of signal lines 300 and a plurality of signal line connection lines 400 located on the base substrate. The base substrate 100 comprises a first region 101 and a second region 102 in the periphery of the first region 101. For example, the second region 102 can be located on a side of the first region 101 in a direction (for example, the Y direction as illustrated in FIG. 1) and can also be at least a portion around the first region 101.

As illustrated in FIGS. 5 to 8, the plurality of sub-pixels 200 are located in the first region 101 and the second region 102. A number of the sub-pixels 200 arranged along the first direction in the first region 101 is larger than a number of the sub-pixels 200 arranged along the first direction in the second region 102. For example, a number of a row or a column of the sub-pixels 200 arranged along a first direction in the first region 101 is larger than a number of a row or a column of the sub-pixels 200 arranged along the first direction in the second region 102.

For example, the first direction of the embodiment of the disclosure is the X direction as illustrated, and the first direction can be a row direction or a column direction. The first direction is the extension direction of the signal line. For example, the first region 101 and the second region 102 are arranged along a direction intersecting with the first direction. For example, as illustrated in the drawings, the first region 101 and the second region 102 are arranged along the Y direction, which can be the second direction. For example, one of the first direction and the second direction can be a row direction and the other can be a column direction. Of course, the first direction and the second direction can be interchanged, but the extension direction of the signal lines located in the display region is parallel to the first direction.

For example, a size of the second region 102 in the first direction is less than a size of the first region 101 in the first direction. For example, a maximum size of the second region 102 in the first direction is not larger than a minimum size of the first region 101 in the first direction, so that the number of sub-pixels 200 arranged along the first direction in the second region 102 is less than the number of the sub-pixels arranged along the first direction in the first region 101.

For example, a ratio of the number of sub-pixels 200 arranged along the first direction in the second region 102 to the number of sub-pixels 200 arranged along the first region 101 can be from 0.01 to 0.9. For example, a ratio of the number of sub-pixels 200 arranged along the first direction in the second region 102 to the number of sub-pixels 200 arranged along the first region 101 can be from 0.05 to 0.8. For example, a ratio of the number of sub-pixels 200 arranged along the first direction in the second region 102 to the number of sub-pixels 200 arranged along the first region 101 can be from 0.07 to 0.7. For example, a ratio of the number of sub-pixels 200 arranged along the first direction in the second region 102 to the number of sub-pixels 200 arranged along the first region 101 can be from 0.1 to 0.6. For example, a ratio of the number of sub-pixels 200 arranged along the first direction in the second region 102 to the number of sub-pixels 200 arranged along the first direction in the first region 101 can be from 0.2 to 0.5. For example, a ratio of the number of sub-pixels 200 arranged along the first direction in the second region 102 to the number of sub-pixels 200 arranged along the first direction in the first region 101 can be from 0.25 to 0.4. For example, a ratio of the number of sub-pixels 200 arranged along the first direction in the second region 102 to the number of sub-pixels 200 arranged along the first direction in the first region 101 may be 0.35 to 0.45.

For example, a portion of the second region 102 away from the first region 101 comprises a sealing portion, and a size of the sealing portion is smaller. For example, a ratio of a size of the second region 102 in the first direction to a size of the first region 101 in the first direction can be from 0.01 to 0.9. For example, a ratio of the size of the second region 102 in the first direction to the size of the first region 101 in the first direction can be from 0.04 to 0.8. For example, a ratio of the size of the second region 102 in the first direction to the size of the first region 101 in the first direction can be from 0.06 to 0.7. For example, a ratio of the size of the second region 102 in the first direction to the size of the first region 101 in the first direction can be from 0.1 to 0.75. For example, a ratio of the size of the second region 102 in the first direction to the size of the first region 101 in the first direction can be from 0.15 to 0.6. For example, a ratio of the size of the second region 102 in the first direction to the size of the first region 101 in the first direction can be from 0.25 to 0.65. For example, a ratio of the size of the second region 102 in the first direction to the size of the first region 101 in the first direction can be from 0.2 to 0.55. For example, a ratio of the size of the second region 102 in the first direction to the size of the first region 101 in the first direction can be from 0.25 to 0.5. For example, a ratio of the size of the second region 102 in the first direction to the size of the first region 101 in the first direction can be from 0.3 to 0.45. For example, a ratio of the size of the second region 102 in the first direction to the size of the first region 101 in the first direction can be from 0.35 to 0.4.

For example, as illustrated in FIGS. 7 and 8, the sub-pixels 200 located in the first region 101 are arranged along the first direction and the second direction in array. For example, the sub-pixels 200 located in the second region 102 are arranged along the first direction and the second direction in array.

For example, an example in which the first direction of the drawings is the row direction and the second direction of the drawings is the column direction is illustrated. The sub-pixels 200 located in the first regions 101 comprise a plurality of sub-pixel rows arranged along the second direction, and the sub-pixels 200 in each of the sub-pixel rows are arranged along the first direction, and respective sub-pixel rows in at least a part of the first region 101 comprises a same number of sub-pixels 200. For example, respective sub-pixel row in the first region 101 comprises a same number of sub-pixels 200. The embodiment of the disclosure is not limited to this, and the first direction can be a column direction and the second direction can be a row direction.

For example, the sub-pixels located in the second region 102 comprise a plurality of sub-pixel rows arranged along the second direction, the sub-pixels 200 in each of the sub-pixel rows are arranged in the first direction, and the number of sub-pixels 200 in different sub-pixel rows can be the same or different. For example, the number of sub-pixels in any of sub-pixel rows in the second region 102 is less than that of sub-pixels in any of sub-pixel rows in the first region 101. FIGS. 5 to 8 illustrates that the second region 102 of the display substrate comprises a notch 103. In this case, each of the sub-pixel rows in the second region 102 comprises two portions located on both sides of the notch 103.

As illustrated in FIGS. 5 to 8, a plurality of signal lines 300 are located in the first region 101 and the second region 102, and each of the signal lines 300 at least partially extends along the first direction, and each of the signal lines 300 is electrically connected with a row/column of the sub-pixels 200 arranged along the first direction.

In some examples, the plurality of signal lines 300 comprises at least one of gate lines and data lines. For example, the signal lines 300 can be only gate lines, or can be only data lines, or comprises gate lines and data lines. The embodiments illustrated in FIGS. 5 to 8 illustrates that the signal lines 300 are gate lines.

In some examples, as illustrated in FIGS. 5 to 8, the display substrate comprises a display region 104 and a non-display region 105, and the second region 102 comprises a portion of the display region 104 and a portion of the non-display region 105. For example, the display region 104 is a region configured to display images, and the non-display region 105 is a region configured not to display images. For example, the non-display region 105 can comprises a sealing portion. For example, the sub-pixels for displaying images and the signal lines (comprising gate lines and data lines) disposed between adjacent sub-pixels are distributed in the display region 104. For example, the embodiment of the disclosure illustrates that the non-display region 105 can be located at a side of the display region 104 or around the display region 104. But it is not limited to this. The display region can also around the non-display region. For example, all the gate lines 300 in the display area 104 in the first region 101 extend in the first direction, and the gate lines 300 in the first region 101 are arranged in the second direction. For example, respective gate lines 300 in the display region 104 within the second region 102 extend along the first direction, and the gate lines 300 in the second region 102 are arranged along the second direction.

As illustrated in FIGS. 5 to 8, a plurality of signal line connection lines 400 are located in the second region 102, and the plurality of signal line connection lines 400 are configured to be electrically connected with the signal lines 300 located in the second region 102, and each of the signal line connection lines 500 at least partially extends along the first direction. For example, the signal line connection line 400 is at least partially located in the non-display region 105.

For example, FIGS. 5 to 8 illustrate that the signal lines are gate lines, and the signal line connection lines are gate line connection lines to be electrically connect with the gate line, and the disclosure is not limited thereto. For example, the signal lines are data lines, and the signal line connection lines are data line connection lines to be electrically connected with the data lines.

In some examples, as illustrated in FIGS. 5 to 8, the display region 104 in the second region 102 comprises two sub-display regions 1041 and 1042 arranged along the first direction. An interval is disposed between the two sub-display regions 1041 and 1042 so that an edge of the second region 102 away from the first region 101 form the above notch 103. For example, the two sub-display regions 1041 and 1042 on both sides of the notch 103 are symmetrically distributed. For example, the sub-pixels 200 in the two sub-display regions 1041 and 1042 on both sides of the notch 103 are symmetrically distributed with respect to a center line of the display region 104 extending in the Y direction. For example, the gate lines 300 in the two sub-display regions 1041 and 1043 on both sides of the notch 103 are symmetrically distributed with respect to the center line. For example, at least a part of the signal line connection lines 400 are distributed with respect to center line symmetrically.

In some examples, as illustrated in FIGS. 5 to 8, the display substrate comprises a sealant region SR located in the non-display region 105, and the sealant region SR is configured to be disposed with a sealant (described hereinafter). For example, the signal line connection line 400 comprises a portion located between the two sub-display regions 1041 and 1042 and located in the sealant region SR, and the signal line connection line 400 is configured to connect the gate lines 300 located in the two sub-display regions 1041 and 1042, respectively. For example, along the direction perpendicular to the base substrate, the signal line connection line overlaps with the sealant disposed in the sealant region.

For example, two portions of gate lines 300 electrically connected with the sub-pixels 200 located on both sides of the notch 103 and located in a same row are electrically connected by a signal line connection line 400. For example, numbers of the two portions of the gate lines 300 electrically connected with the sub-pixel rows located at both sides of the notch 103 is the same, and a number of the signal line connection lines 400 is the same as that of the gate lines 300 located at a side of the notch 103.

For example, FIGS. 5 to 8 illustrates that the two sub-display regions are arranged along the extension direction of the gate lines, and the disclosure is not limited thereto. The two sub-display regions can also be arranged along the extension direction of the data lines, so that the two data lines electrically connected with the sub-pixels located at both sides of the notch and located in the same column are electrically connected by a signal line connection line.

As illustrated in FIGS. 5 to 8, the display substrate further comprises a plurality of overlapping traces 500 located in the second region 102. The plurality of overlapping traces are disposed at intervals and located in a layer different from that of the plurality of signal line connection lines 400. An orthographic projection of one signal line connection line 400 on the base substrate 100 is completely within an orthographic projection of one overlapping trace 500 on the base substrate 100.

For example, the signal lines can be gate lines, and an orthographic projection of the gate line connection line electrically connected with at least one gate line located in the second region on the base substrate is within an orthographic projection of at least one overlapping trace on the base substrate; the signal lines can be data lines, and an orthographic projection of the data line connection line electrically connected with at least one data line located in the second region on the base substrate is within an orthographic projection of at least one overlapping trace on the base substrate.

For example, an orthographic projection of at least one signal line connection line 400 on the base substrate 100 is completely within an orthographic projection of at least one overlapping trace 500 on the base substrate 100. For example, an orthographic projection of at least a part of the signal line connection lines 400 on the base substrate 100 is completely within an orthographic projection of the corresponding overlapping traces 500 on the base substrate 100. For example, each of the overlapping traces 500 has a same extension direction as the signal line connection line 400 overlapping with it. In the display substrate of the disclosure, the signal line connection lines overlap with the overlapping traces. In order to clearly illustrate the position of the signal line connection lines 400 and the connection relationship of the signal line connection lines and the gate lines 300, the overlapping traces 500 are omitted in FIG. 8. In addition, the gap between the overlapping traces 500 and the gate lines 300 as illustrated in FIG. 7 indicates that the overlapping traces 500 and the gate lines 300 are not electrically connected.

In the display substrate of the disclosure, the orthographic projection of at least one signal line connection line on the base substrate is completely within the orthographic projection of the overlapping trace on the base substrate, which can increase an overlap area of the signal line connection line and the overlapping trace as much as possible on the premise of satisfying the light transmittance of the metal layer in the display substrate directly opposing to the sealant, so that the resistance-capacitance load (RC load) on the signal line in the second region of the display substrate with special shape can be compensated in maximum to avoid that a low gray scale image is displayed unevenly in the display substrate with special shape as much as possible.

The resistance and capacitance of each of the signal lines are directly related to the delay time when the signal line voltage changes, thus affecting the charging time of sub-pixels and the charging of sub-pixels. In the embodiment of the disclosure, by compensating the resistance and capacitance of the signal lines, the RC load of each of the signal lines is compensated to be consistent with the RC loads of its adjacent signal lines and all other signal lines, and the delay time of these signal lines tends to be consistent, which will not affect the charging time and charging of the sub-pixels, thus avoiding the occurrence of mura caused by this problem.

As illustrated in FIG. 4, the extension direction of the cover strip 13 intersects with the extension direction of the signal line connection line 11, and a portion of the orthographic projection of one signal line connection line 11 on the base substrate does not overlap with the orthographic projection of the cover strip 13 overlapping with the one signal line connection line 11 on the base substrate. The capacitance calculation formula is $C=\varepsilon 0*\varepsilon r*S/d$. $\varepsilon 0*\varepsilon r$ is the dielectric constant, and S is the area of the signal line connection line directly opposing to the overlapping trace, d is the distance between the signal line connection line and the overlapping trace. In the display substrate of the disclosure, the orthographic projection of the signal line connection line on the base substrate is completely within the orthographic projection of the overlapping trace on the base substrate, which can increase an overlap area S of the signal line connection line and the overlapping trace without changing other parameters, so that the resistance-capacitance load (RC load) on the signal line in the second region of the display substrate with special shape can be compensated in maximum to avoid that a low gray scale image is displayed unevenly in the display substrate with special shape.

For example, as illustrated in FIGS. 7 and 8, the second region 102 is disposed with the notch 103, and the signal line connection line 400 extends along an edge of the notch 103. For example, the edge of the notch 103 comprises a straight side extending in the X direction and an arc side, and the signal line connection line 400 comprises a straight line part extending along the straight side of the notch 103 and an arc part extending along the arc side of the notch 103. For example, the straight line part of the signal line connection line 400 is parallel to the first direction. For example, the arc part of the signal line connection line 400 is electrically connected with the signal lines 300 located in the second region 102. For example, the signal line connection line 400 can further comprise another straight line part with an arc part away from the notch 103 and extending in the first direction, and the straight line part is connected with the gate line 300. For example, a connection part can be disposed between the signal line connection line 400 and the signal line 300 to connect the signal line connection line 400 with the signal line 300.

In some examples, as illustrated in FIGS. 5 to 8, the extension direction of the overlapping trace 500 is the same as that of the signal line connection line 400. For example, the signal line connection line 400 comprises the straight line part and the arc part, and the overlapping trace 500 also comprises a straight line part overlapping with the straight line part of the signal line connection wire 400 and an arc part overlapping with the arc part of the signal line connection line 400.

In some examples, as illustrated in FIGS. 5 to 8, a line width of the overlapping trace 500 is larger than or equal to a line width of the signal line connection line 400. For example, the line width of the overlapping trace 500 is larger than the line width of the signal line connection line 400. For example, the line width of the overlapping trace 500 is equal to the line width of the signal line connection line 400.

For example, a line width of the signal line connection line 400 is not less than 2 micrometers. For example, the line width of the signal line connection line 400 can be from 3 to 6 micrometers. For example, the line width of the signal line connection line 400 can be from 4 to 5.5 micrometers. For example, the line width of the signal line connection line 400 can be from 4.5 to 5 micrometers. For example, a distance between the signal line connection lines 400 can be from 1.5 to 6 micrometers. For example, the distance between the signal line connection lines 400 can be from 1.5 to 6 micrometers. For example, the distance between the signal line connection lines 400 can be from 2 to 4 micrometers. For example, the distance between the signal line connection lines 400 can be from 3 to 5 micrometers.

For example, a single-sided line width of the overlapping trace 500 (that is, half of the line width) is 0.5 to 2.5 micrometers larger than a single-sided line width of the signal line connection line 400. For example, the line width of the overlapping trace 500 is 1 to 5 micrometers larger than the line width of the signal line connection line 400. For example, the line width of the overlapping trace 500 is 1.5 to 4 micrometers larger than the line width of the signal line connection line 400. For example, the line width of the overlapping trace 500 is 2-2.5 micrometers larger than the line width of the signal line connection line 400. For example, the line width of the overlapping trace 500 is 2.2 to 3 micrometers larger than the line width of the signal line connection line 400. In the display substrate of the disclosure, the line width of the overlapping trace is larger than the line width of the signal line connection line, which can reduce the process requirements of the overlapping trace and the signal line connection line in the production process. Even if the overlapping trace has a relative displacement with respect to the signal line connection line, the orthographic projection of the signal line connection line on the base substrate is still completely within the orthographic projection of the overlapping trace on the base substrate.

In some examples, as illustrated in FIGS. 5 to 8, the plurality of overlapping traces 500 are disposed in one-to-one correspondence with the plurality of signal line connection lines 400, respectively. An orthographic projection of each of the signal line connection lines on the base substrate is completely within an orthographic projection of the overlapping trace disposed correspondingly on the base substrate, and an interval of two adjacent overlapping traces is not less than 1.5 micrometers.

For example, the interval between adjacent overlapping traces 500 is not less than 2 micrometers. For example, the interval between adjacent overlapping traces 500 is not less than 2.5 micrometers. For example, the interval between adjacent overlapping traces 500 is not less than 3 micrometers. For example, the interval between adjacent overlapping traces 500 is not less than 3.5 micrometers. For example, the interval between adjacent overlapping traces 500 is not less than 4 micrometers. For example, the interval between adjacent overlapping traces 500 is not less than 4.5 micrometers. For example, the interval between adjacent overlapping traces 500 is not less than 5 micrometers. For example, the interval between adjacent overlapping traces 500 is not larger than 6 micrometers.

For example, a display side of the display substrate is disposed with a sealant, and along the direction perpendicular to the base substrate, the sealant overlaps with the interval between adjacent overlapping traces. For example, in the curing process of the sealant in the cell-assembling process of the liquid crystal display device, it is necessary to irradiate the material of the sealant with light (for example, ultraviolet light) to perform curing, and the interval between adjacent overlapping traces can transmit light in a better manner to realize the curing of the sealant.

In the embodiment of the disclosure, the plurality of overlapping traces are disposed to overlap with the plurality of signal line connection lines in one-to-one correspondence, and the interval between adjacent overlapping traces is not less than 1.5 micrometers, so that the light transmittance of the metal layer at the position of the display substrate directly opposing to the sealant can be satisfied while the overlapping traces and the signal line connection lines have a maximized overlap area to compensate the capacitance on the gate lines in the second region.

For example, the number of overlap wring lines 500 is the same as the number of signal line connection lines 400. Of course, the embodiments of the disclosure are not limited to this. In the case that the orthographic projection of the signal line connection lines on the layer where the overlapping traces are located is be completely located within the overlapping traces, the number of the overlapping traces can be different from the number of the signal line connection lines. For example, the number of the overlapping traces can be greater than the number of the signal line connection lines, or the number of overlap connection lines can be less than the number of the signal line connection lines. For example, along the direction perpendicular to the base substrate, an overlapping trace can overlap with a signal line connection line, and an overlapping trace can also overlap with multiple signal line connection lines.

In some examples, as illustrated in FIGS. 5 to 8, the signal lines comprise gate lines 300, and the display substrate further comprises a plurality of data lines 600. The plurality of data lines 600 are located on a side of the gate lines 300 away from the base substrate 100, each of the data lines 600 at least partially extends along a second direction, and the second direction intersects with the first direction. In the direction perpendicular to the base substrate 100, the data line 600 does not overlap with the signal line connection line 400. For example, the data line 600 is only located in the first region 101. For example, the data line 600 comprises a portion located in the first region 101 and a portion located in the second region 102.

For example, as illustrated in FIGS. 5 to 8, the plurality of data lines 600 are arranged in the first direction, and each of the data lines 600 extends in the second direction. For example, the plurality of data lines 600 and the plurality of gate lines 300 intersect to define pixel regions where the plurality of sub-pixels 200 are arranged in array along the first direction and the second direction. For example, at least a part of the pixel regions is located in the display region.

Figure 9:
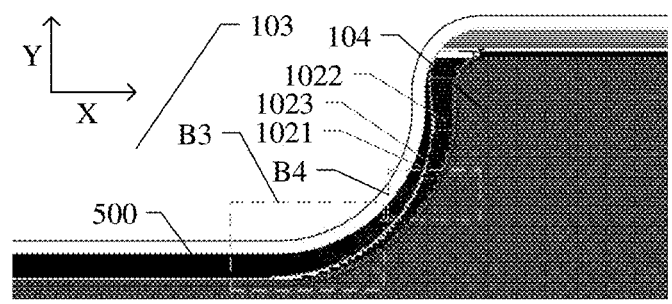
FIG. 9 is a partial enlarged view of the region B2 as illustrated in FIG. 6.
Figure 10:
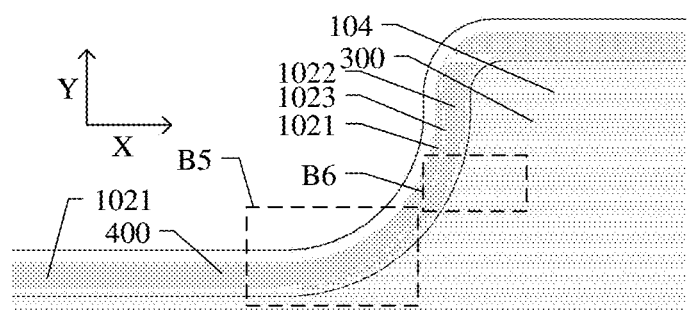
FIG. 10 is a schematic view of a layer where the gate line is located in the region as illustrated in FIG. 9.
Figure 11:
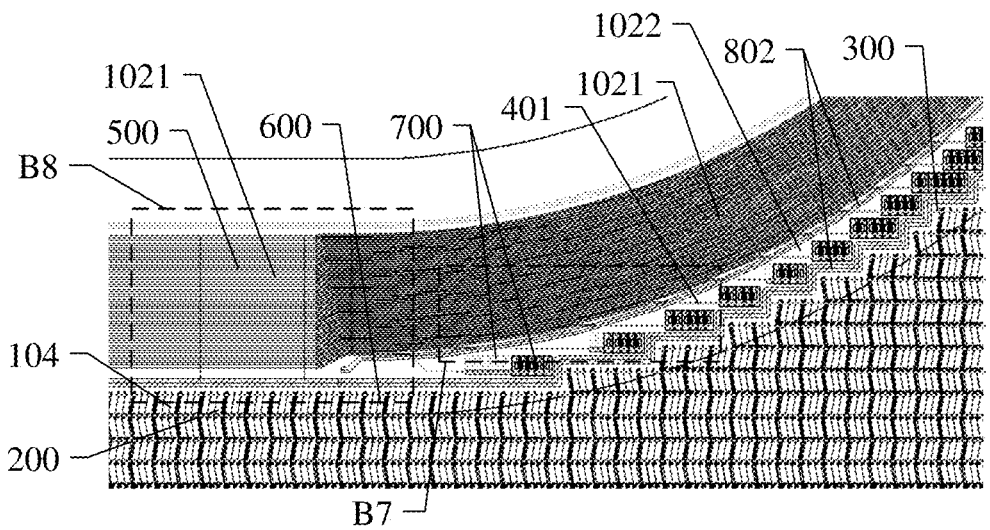
FIG. 11 is a partial enlarged view of the region B3 as illustrated in FIG. 9.
Figure 12:
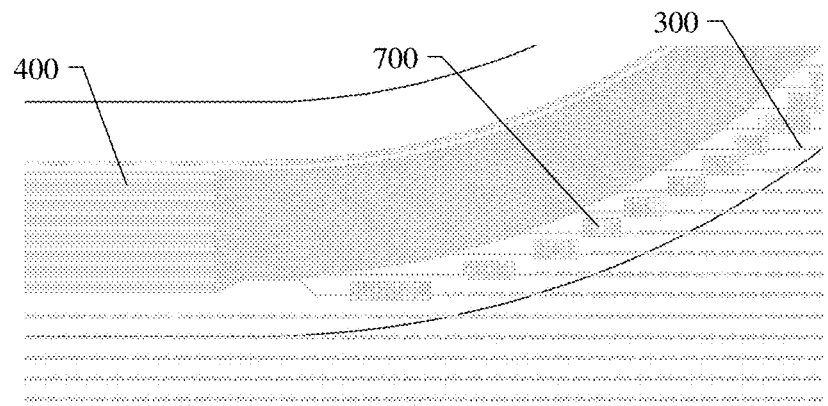
FIG. 12 is a partial enlarged view of the region B5 as illustrated in FIG. 10.
Figure 13:
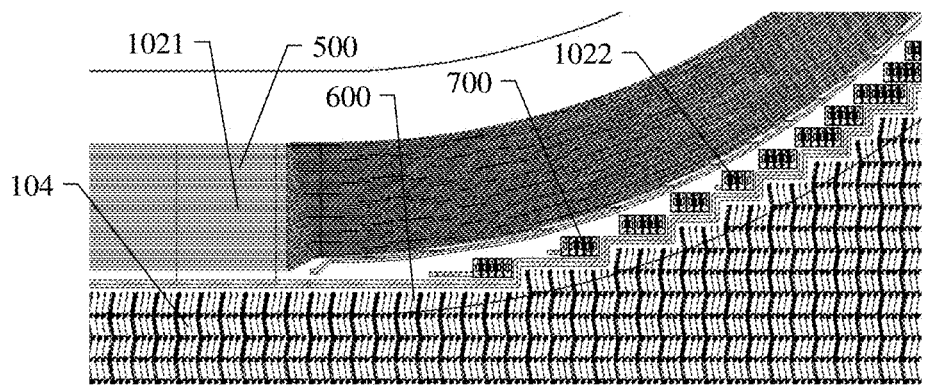
FIG. 13 is a schematic view of a layer where the data line is located in the region as illustrated in FIG. 11.
Figure 14:
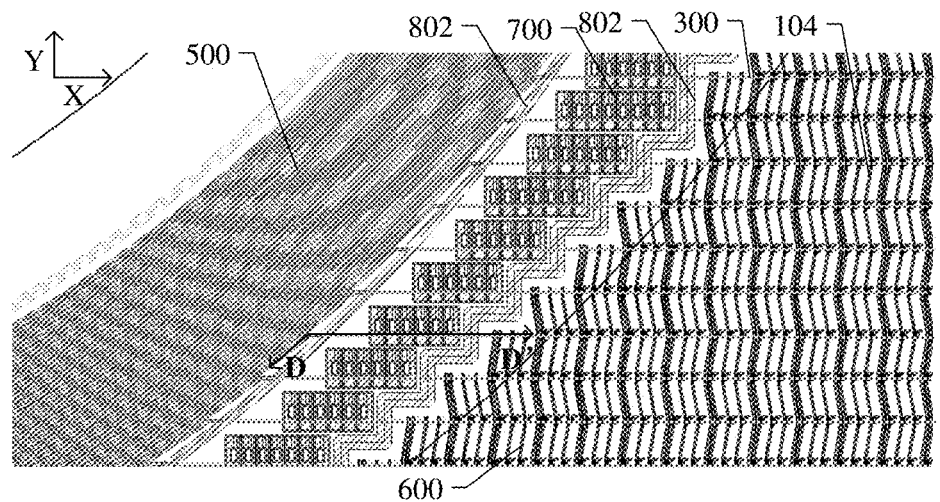
FIG. 14 is a partial enlarged view of the region B4 as illustrated in FIG. 9.
Figure 15:
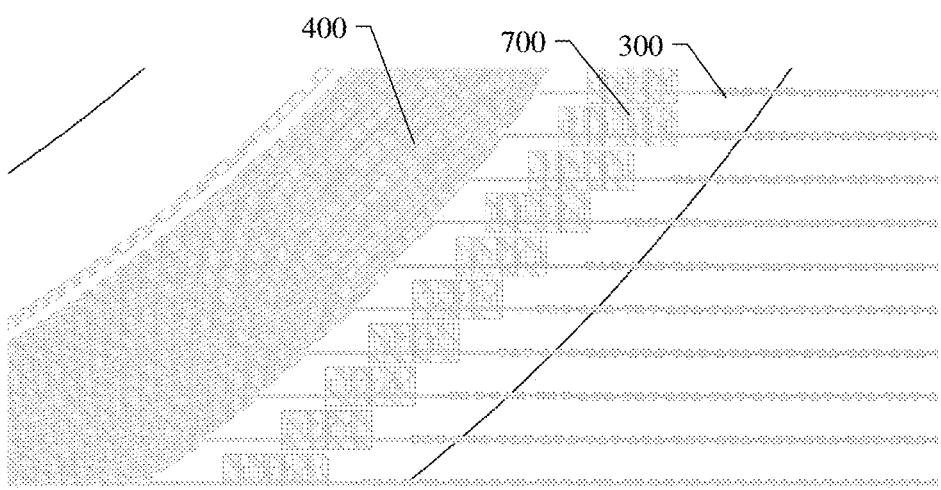
FIG. 15 is a partial enlarged view of the region B6 as illustrated in FIG. 10.
Figure 16:
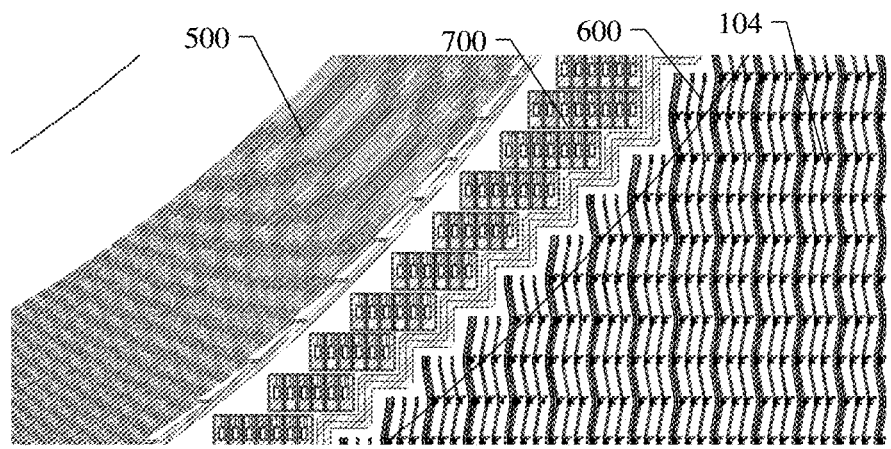
FIG. 16 is a schematic view of a layer where the data line is located in the region as illustrated in FIG. 14.

FIG. 9 is a partial enlarged view of the region B2 as illustrated in FIG. 6, FIG. 10 is a schematic view of a layer where the gate line is located in the region as illustrated in FIG. 9. FIG. 11 is a partial enlarged view of the region B3 as illustrated in FIG. 9, FIG. 12 is a partial enlarged view of the region B5 as illustrated in FIG. 10, FIG. 13 is a schematic view of the layer where the data line is located in the region as illustrated in FIG. 11, FIG. 14 is a partial enlarged view of the region B4 as illustrated in FIG. 9. FIG. 15 is a partial enlarged view of the region B6 as illustrated in FIG. 10, and FIG. 16 is a schematic view of the layer where the data line is located in the region as illustrated in FIG. 14.

In some examples, as illustrated in FIGS. 11 to 16, the signal line connection line 400 is electrically connected with the gate line 300 located at least on one side of the signal line connection line 400 in the first direction, a block capacitance compensation structure 700 is disposed between the signal line connection line 400 and the gate line 300 electrically connected with the signal line connection line 400. The capacitance compensation structure 700 is located in the non-display region, and the capacitance compensation structure 700 is electrically connected with both of the gate line 300 and the signal line connection line 400 located at both sides of the capacitance compensation structure 700, respectively.

For example, as illustrated in FIGS. 11 to 16, a number of capacitance compensation structure(s) 700 disposed between one signal line connection line 400 and the gate line 300 electrically connected with the one signal line connection line 400 is at least one. For example, the number of the capacitance compensation structure(s) 700 electrically connected with different gate lines 300 can be the same or different.

For example, as illustrated in FIGS. 5 to 16, in at least portion of the second region 102, lengths of the gate lines 300 arranged along the arrangement direction of the first region 101 and the second region 102 (the direction indicated by the arrow in the Y direction, as illustrated) gradually decreases. For example, a number of capacitance compensation structures 700 electrically connected with the gate lines 300 with shorter length can be greater than a number of capacitance compensation structures 700 electrically connected with the gate lines 300 with longer length to balance the RC load difference between the gate lines with different lengths. For example, the length of the signal line connection line 400 electrically connected with the gate line 300 with shorter length can be greater than the length of the signal line connection line 400 electrically connected with the gate line 300 with longer length to balance the RC load difference between the gate lines with different lengths.

For example, as illustrated in FIGS. 11 to 16, at least one capacitance compensation structure 700 comprises a double-layer structure in which double layers are stacked, one layer which is located on the same layer as the gate line 300 and is electrically connected with the gate line 300, and the other layer which can be located on the same layer as the data line 600, and the disclosure is not limited thereto. The other layer can also be a conductive layer on a side of the data line away from the base substrate (for example, a conductive layer on the same layer as the common electrode). The capacitance compensation structure is disposed as the double-layer structure, which is beneficial to reduce the difference between the RC load on the gate line electrically connected with the capacitance compensation structure and the RC load on the gate line in the first region. Of course, the embodiment of the disclosure is not limited to this. At least one capacitance compensation structure can also comprise a three-layer structure in which three layers are stacked, for example, one layer which is in the same layer as the gate line and is electrically connected with the gate layer, one layer which is the same layer as the data line, and one conductive layer which is on a side of the data line away from the base substrate.

For example, as illustrated in FIGS. 11 to 16, at least one capacitance compensation structure 700 comprises an opening to improve the light transmittance of the position where the capacitance compensation structure is located, which is beneficial to curing the sealant.

In some examples, as illustrated in FIGS. 9 to 16, the non-display region in the second region 102 comprises a first sub-region 1021 and a second sub-region 1022. The second sub-region 1022 is located between the first sub-region 1021 and the display region 104. The signal line connection line 400 is located in the first sub-region 1021. The capacitance compensation structure 700 is located in the second sub-region 1022. FIGS. 9 and 10 illustrate a division line 1023 between the first sub-region 1021 and the second sub-region 1022. The division line 1023 can be the interval between the signal line connection line 400 in the first sub-region 1021 and the capacitance compensation structure 700 in the second sub-region 1022, or the common electrode line between the signal line connection line 400 in the first sub-region 1021 and the capacitance compensation structure 700 in the second sub-region 1022.

For example, as illustrated in FIG. 11, the second sub-region 1022 is disposed with a connection part 401, and the signal line connection line 400 is electrically connected with the gate line 300 by the connection part 401. For example, the signal line connection line 400, the connection part 401 and the gate line 300 can be an integrated structure.

For example, as illustrated in FIGS. 9 to 16, the second sub-region 1022 is located on both sides of the notch 103 in the first direction. For example, the second sub-region 1022 is located on a side of the first sub-region 1021 away from the notch 103. For example, the capacitance compensation structures 700 are only distributed on both sides of the notch 103 in the first direction, there is no capacitance compensation structure 700 disposed between the notch 103 and the first region 101, and the second sub-region 1022 is distributed on both sides of the notch 103 in the first direction, and there is no second sub-region 1022 disposed between the notch 103 and the first region 101. For example, the signal line connection line 400 comprises two portions distributed on both sides of the notch 103 in the first direction and a portion distributed between the notch 103 and the first region 101, and the first sub-region 1021 comprises two portions located on both sides of the notch 103 in the first direction and a portion located between the notch 103 and the first region 101.

For example, the second sub-region 1022 located on both sides of the notch 103 is symmetrically distributed with respect to the center line of the non-display region extending in the Y direction. For example, the capacitance compensation structures 700 located on both sides of the notch 103 are symmetrically distributed with respect to the center line of the non-display region extending in the Y direction. For example, the first region 1021 is symmetrically distributed with respect to the center line of the non-display region extending in the Y direction.

For example, as illustrated in FIGS. 5 to 16, the first sub-region 1021 comprises a portion between the notch 103 and the display region of the second region 102 and a portion between the notch 103 and the display region of the first region 101. For example, the first sub-region 1021 extends along the edge of the notch 103. For example, the signal line connection line 400 located on a side of the notch 103 in the X direction extends in the Y direction.

According to the display substrate of the embodiment of the disclosure, the orthographic projection of the signal line connection line on the overlapping trace is completely within in the overlapping trace and meanwhile, the capacitance compensation structure is disposed between the signal line connection line and the gate line, which can commonly compensate the RC load on the gate line in the second region, so that the difference between the RC load on the gate line in the second region and the RC load on the gate line in the first region can be minimized.

For example, as illustrated in FIGS. 5 to 16, the RC load on the gate line 300 electrically connected with a row of sub-pixels 200 in the first region is a first RC load, and the RC load on the gate line 300 electrically connected with a row of sub-pixels 200 in the second region is a second RC load, and a ratio of the second RC load to the first RC load is from 0.85 to 1.

For example, the ratio of the second RC load to the first RC load is not less than 0.88. For example, the ratio of the second RC load to the first RC load is not less than 0.9. For example, the ratio of the second RC load to the first RC load is not less than 0.92. For example, the ratio of the second RC load to the first RC load is not less than 0.95.

In some examples, the plurality of signal lines comprise a plurality of gate lines, and the sub-pixel 200 comprises a common electrode (801, described hereinafter) located on a side of the data lines away from the base substrate; in the first region 101, the value of the capacitance generated between the gate line 300 electrically connected with a row of sub-pixels 200 and the data line 600 and the common electrode 801 which overlap with the gate line is a first capacitance value $C1$; in the second region 102, a sum value of the capacitance generated between the gate line 300 electrically connected with a row of sub-pixels 200 and the data line 600 and the common electrode 801 which overlap with the gate line, the capacitance generated between a signal line connection line 400 electrically connected with the gate line 300 and the overlapping trace 500 which overlaps with the signal line connection line, and the capacitance on the capacitance compensation structure 700 is a second capacitance $C2$ value, and a ratio of the second capacitance $C2$ to the first capacitance $C1$ is from 0.85 to 1.

For example, in the display substrate according to the embodiment of the disclosure, each of the pixel units can comprise a pixel electrode and a thin film transistor. The gate line is connected with a gate electrode of the thin film transistor to control the on or off states of the thin film transistor. The pixel electrode is connected with one of a source electrode and a drain electrode of the thin film transistor. The data line is connected with the other of the source electrode and drain electrode of the thin film transistor. A voltage signal required for displaying an image is input to the pixel electrode by the thin film transistor to performance the display of the array substrate.

Figure 17:
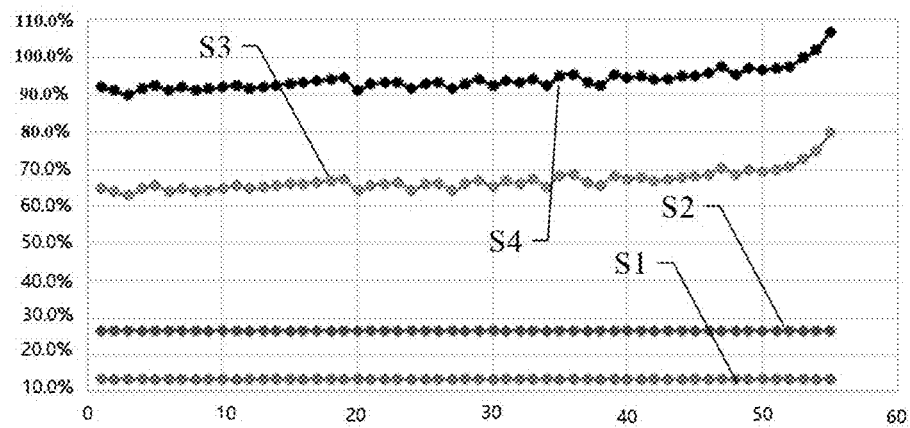
FIG. 17 is a graph illustrating a relationship between the capacitance values of the gate lines in different regions of the display substrate as illustrated in FIG. 1 and the display substrate as illustrated in FIG. 5.

FIG. 17 is a graph illustrating a relationship between the capacitance values of the gate lines in different regions of the display substrate as illustrated in FIG. 1 and the display substrate as illustrated in FIG. 5. As illustrated in FIG. 17, an abscissa of line S1 to line S4 indicates a number of gate lines. An example in which the number of the gate lines is 57 illustrated in the drawing. An ordinate of line S1 indicates a ratio of a value of the capacitance generated between the signal line connection line 11 and the corresponding cover strip 13 as illustrated in FIG. 2 to a value C02 of the capacitance generated between the gate line and other conductive layers (data lines and common electrodes) in the third display region, for example, less than 20%. The ordinate of the line S2 indicates a ratio of a value of the capacitance generated between the signal line connection line 400 and the overlapping trace 500 as illustrated in FIG. 7 to a value of the capacitance generated between the gate line and other conductive layers (data line and common electrode) in the first region, for example, more than 20%; an ordinate of the line S3 indicates a ratio of the value C03 of the capacitance generated between the corresponding gate lines and other conductive layers on both sides of the notch in the first display region and the second display region in FIG. 1 and commonly compensated by capacitance generated between the signal line connection line 11 and the corresponding cover strip 13 and the capacitance generated by the capacitance compensation structure 16 as illustrated in FIG. 2 to the value C02 of the capacitance generated between the gate line and other conductive layers in the third display region, for example, less than 70% or less than 80%; an ordinate of the line S4 indicates a ratio of the value of the capacitance generated between the gate lines and other conductive layers in the second region and commonly compensated by capacitance generated between the signal line connection line 400 and the overlapping trace 500 as illustrated in FIG. 7 and the capacitance generated by the capacitance compensation structure 16 as illustrated in FIG. 11 to the value of the capacitance generated between the gate line and other conductive layers in the first region, for example, larger than 90%.

In the display substrate according to the disclosure, the capacitance on the gate line of the second region is compensated, so that a ratio of the capacitance on the gate line in the second region to the capacitance on the gate line in the first region is greater than 90%, which is beneficial to reducing the RC load difference between the first region and the second region, so as to reduce the display difference.

For example, a value of the capacitance generated between each of the gate lines 300 and other conductive layers in the first region 101 in the display substrate as illustrated in FIGS. 5 to 16 is C1. The values of the capacitances on different gate lines 300 can be the same.

For example, a range of the third display region in the display substrate as illustrated in FIGS. 1 to 4 can be the same as the display region in the first region in the display substrate as illustrated in FIGS. 5 to 16. The value C02 of the capacitance generated between each of the gate lines and other conductive layers in the third display region in the display substrate as illustrated in FIGS. 1 to 4 is the same as the value C1 of the capacitance generated between each of the gate lines and other conductive layers in the first region in the display substrate as illustrated in FIGS. 5 to 16. The value of the capacitance generated between a signal line connection line 400 and an overlapping trace 500 in the display substrate as illustrated in FIGS. 5 to 16 is larger than the value of the capacitance generated between a signal line connection line 11 and the corresponding cover strip 13 in the display substrate as illustrated in FIGS. 1 to 4.

For example, as illustrated in FIG. 17, a ratio of the capacitance generated between a corresponding gate line (the gate line connected with a signal line connection line 400 and the capacitance compensation structure) and other conductive layers in the second region and commonly compensated by capacitance generated between the above signal line connection line 400 and am overlapping trace 500 as illustrated in FIGS. 5-16 and the capacitance generated by the capacitance compensation structure 16 as illustrated in FIG. 11 to the value of the capacitance generated between the gate line and other conductive layers in the first region is, for example, larger than 90%. For example, when the RC load of the maximum number of display lines needs to be compensated, the RC load on the gate line in the second area is more than 90% of the RC load on the gate line in the first region, thus achieving a better display effect.

According to the display substrate of the embodiment of the disclosure, the orthographic projection of the signal line connection line on the overlapping trace is completely within the overlapping trace, which can greatly reduce the difference between the RC load on the gate line in the second region and the RC load on the gate line in the first region.

Figure 18:
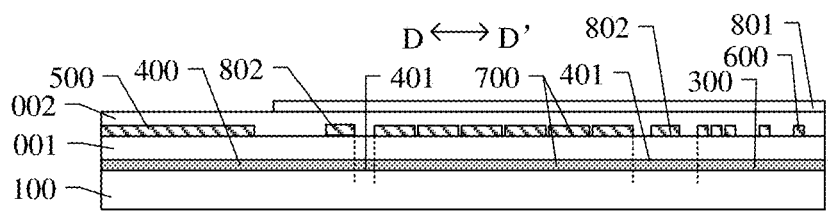
FIG. 18 is a partial sectional view taken by the line DD' as illustrated in FIG. 14.

FIG. 18 is a partial sectional view taken by line DD' as illustrated in FIG. 14. In some examples, as illustrated in FIG. 18, the signal line connection line 400 is disposed in a same layer as the gate line 300 electrically connected with the signal line connection line 400. For example, the signal line connection line 400 and the gate line 300 electrically connected with the signal line connection line 400 can be integrally disposed. When the signal line connection line 400 and the gate line 300 is integrally disposed, the signal line connection line 400 can also be referred as a portion of the gate line 300. For example, both of the signal line connection line 400 and the connection part 401 can be referred as a part of the gate line 300.

For example, as illustrated in FIGS. 14 and 18, the capacitance compensation structure 700 can comprises two layers. One layer and the data line 600 are in the same layer and are disposed at intervals, and the other layer and the gate line 300 are in the same layer and are electrically connected. For example, two connection parts 401 are arranged on both sides of the capacitance compensation structure 700. For example, the portion of the capacitance compensation structure 700 located in the same layer as the gate line 300, and the gate line 300, the signal line connection line 400 and the connection part 401 can be integrally disposed.

In some examples, as illustrated in FIGS. 14 and 18, the overlapping trace 500 is located on the side of the signal line connection line 400 away from the base substrate 100.

In some examples, as illustrated in FIGS. 14 and 18, the overlapping trace 500 is disposed in a same layer as the data lines 600. For example, a layer of the capacitance compensation structure 700, the overlapping trace 500 and the data line 600 can be disposed in a same layer. Of course, the embodiment of the disclosure is not limited to this. The capacitance compensation structure 700 can also be disposed with a layer located on the side of the data line away from the base substrate to further compensate the RC load on the gate line in the second region.

For example, as illustrated in FIG. 18, an insulation layer 001, for example a gate insulation layer 001, is disposed between the gate line 300 and the data line 600. For example, an insulation layer 002, for example a passivation layer 002, is disposed on the side of the data line 400 away from the gate line 300.

For example, as illustrated in FIG. 18, the sub-pixel 200 comprises a common electrode 801, located on the side of the data line 600 away from the base substrate 100. For example, FIG. 18 illustrates the position of the common electrode 801. For example, a portion of the common electrode 801 on left side of the D' position can be an entire layer, and a portion of the common electrode on right side of the D' position can be a grid structure. For example, the common electrode 801 does not overlap with the overlapping trace 500.

For example, as illustrated in FIGS. 14 and 18, the display substrate further comprises a common electrode line 802 located on the base substrate 100. The common electrode line 802 is configured to be electrically connected with the common electrode 801. For example, the common electrode line 802 comprises a portion disposed in the same layer as the data line 600. For example, the common electrode line 802 can further comprise a portion disposed in the same layer as the common electrode 801.

For example, as illustrated in FIGS. 6 and 9, the common electrode line can be a division line between the first sub-region 1021 and the second sub-region 1022. For example, a common electrode line can surround the second sub-region 1022. For example, as illustrated in FIG. 11, a side of the first sub-region 1021 away from the display region is also disposed with a ground line (GND) 803. For example, the common electrode line can also surround a region formed by the first sub-region 1021 and the second sub-region 1022. For example, the common electrode line is disposed on a side of the first sub-region 1021 away from the display region, which can be referred to the disposition of the ground line 803.

Figure 19:
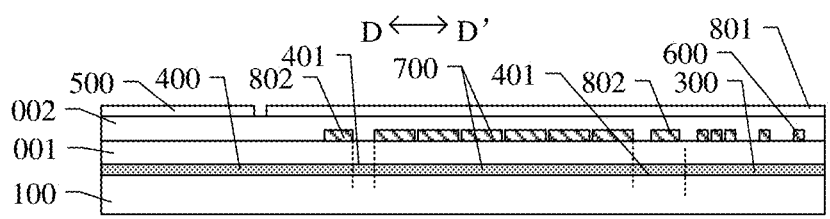
FIG. 19 is a partial sectional view taken by the line DD' as illustrated in FIG. 14 in another example according to the embodiment of the disclosure.

FIG. 19 is a partial sectional view taken by the line DD' as illustrated in FIG. 14 in another example according to the embodiment of the disclosure. The display substrate illustrated in FIG. 19 is different from the display substrate illustrated in FIG. 18 in that the overlapping trace 500 is located on the side of the data line 600 away from the base substrate 100.

For example, as illustrated in FIG. 19, the overlapping trace 500 can be disposed in a same layer as the common electrode 801. For example, the overlapping trace 500 can be made of the same material as the common electrode 801. For example, an interval is disposed between the overlapping trace 500 and the common electrode 801. For example, an interval is disposed between adjacent overlapping traces 500. For example, the common electrode can also be integrated with the overlapping trace, for example, the overlapping trace is a portion of the common electrode which is an entire layer.

Of course, the embodiment of the disclosure is not limited to the case that the overlapping trace 500 overlapping with the signal line connection line 400 only comprises a layer of film. For example, two layers of overlapping traces 500 can be disposed on the side of the signal line connection line 400 away from the base substrate 100. The positions of the two layers of overlapping traces can be the same as the positions of the two layers of overlapping traces as illustrated in FIGS. 18 and 19, that is, the two layers of overlapping traces 500 are respectively disposed in the same layer as the data line and the common electrode.

Figure 20:
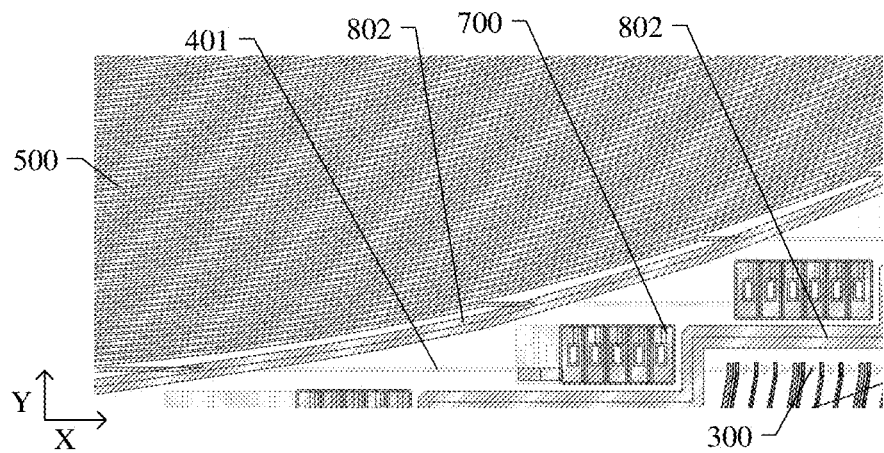
FIG. 20 is a partial enlarged view of the region B7 as illustrated in FIG. 11.
Figure 21:
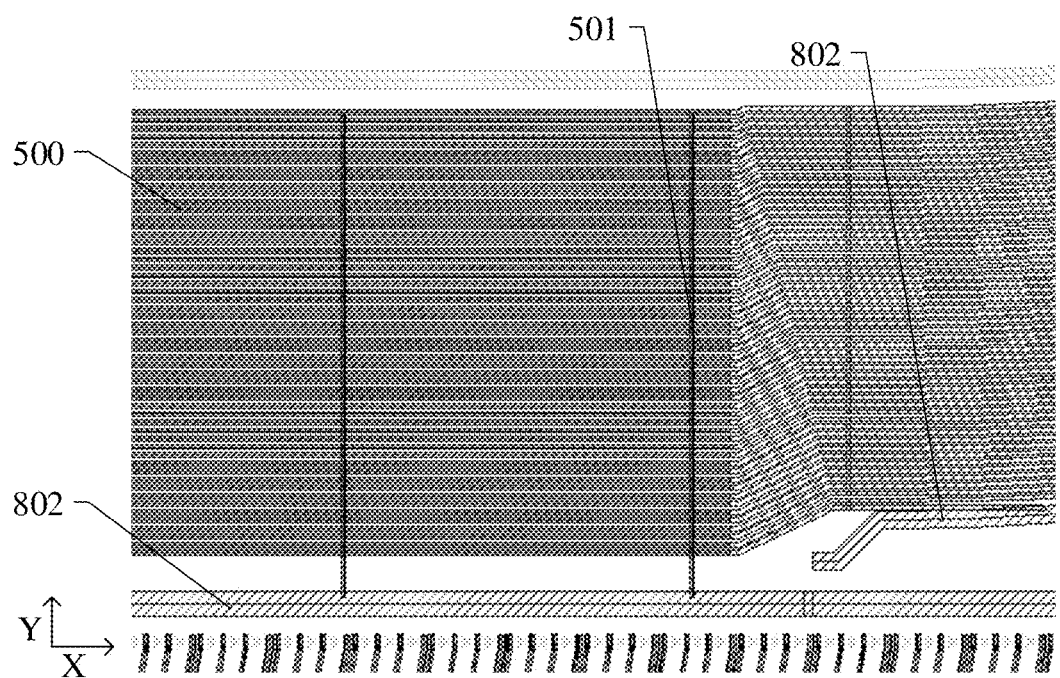
FIG. 21 is a partial enlarged view of the region B8 as illustrated in FIG. 11.

FIG. 20 is a partial enlarged view of the region B7 as illustrated in FIG. 11, and FIG. 21 is a partial enlarged view of the region B8 as illustrated in FIG. 11. In some examples, as illustrated in FIGS. 11, 16 and 20, the common electrode line 802 is electrically connected with the overlapping trace 500.

In some examples, as illustrated in FIG. 11, FIG. 16 and FIG. 20, a portion of the common electrode line 802 located in the second region is disposed in the same layer as the overlapping trace 500, and the portion of the common electrode line 802 is located between the overlapping trace 500 and the display region. The overlapping trace 500 is integrally disposed with the portion of the common electrode line 802.

For example, as illustrated in FIGS. 11, 16 and 20, an example in which a direction indicated by the arrow of the X direction is towards right is illustrated. The signal line connection line 400 extends towards the right side to the common electrode line 802 to be electrically connected with the gate line 300 located on the right side of the common electrode line 802. The overlapping trace 500 covering the signal line connection line 400 extends towards the right side to the common electrode line 802. For example, when the gate line 300, the connection part 401 and the signal line connection line 400 is an integrated structure, and the common electrode line 802 can be used as the division line between the gate line 300 and the connection part 401, and/or the division line between the connection part 401 and the signal line connection line 400. For example, the common electrode line 802 and the overlapping trace 500 can both be symmetrically distributed with respect to the center line extending in the Y direction of the first region. FIG. 11 illustrates the portion located on the right side of the center line, and the portion located on the left side of the center line can be referred to the portion located on the right side of the center line.

The embodiment of the disclosure can reduce the overall impedance of the common electrode by electrically connecting the signal line connection line with the common electrode line.

For example, as illustrated in FIG. 11, the common electrode line 802 further comprises a portion located at a side of the capacitance compensation structure 700 away from the overlapping trace 500. For example, the portion of the common electrode line 802 can be in a step shape, and a portion of the capacitance compensation structure 700 close to the overlapping trace 500 can be in an arc shape. Of course, the embodiment of the disclosure is not limited to this, and the shape of the common electrode line can be designed according to the requirements of space and products. For example, the overlapping trace 500 can be electrically connected with a portion of the common electrode line 802 having arc shape. For example, the two portions of the common electrode lines 802 located on both sides of the capacitance compensation structure 700 close to the first region can be distributed at intervals.

In some examples, as illustrated in FIGS. 11 and 21, the display substrate further comprises a connection line 501. An extension direction of the connection line 510 intersects with an extension direction of the overlapping trace 500. The connection line 501 is configured to electrically connect the overlapping trace 500 with the portion of the common electrode line 802 located in the second region. The connection line 501 is disposed in a same layer as at least one of the overlapping trace 500 and the common electrode line 802.

For example, as illustrated in FIG. 21, the connection line 501, the overlapping trace 500 and the common electrode line 802 are all disposed in a same layer. The connection line 501 and the overlapping trace 500 form a grid-like structure, for example, a portion of the common electrode line 802, the connection line 501 and the overlapping trace 500 are integrally disposed. For example, the connection line 501 is electrically connected with a portion of the common electrode line 802 at a side of the capacitance compensation structure 700 away from the overlapping trace 500.

The above mode of integration of the signal line connection line and the common electrode line, as illustrated in FIG. 20, and the mode of disposing the connection line to realize the electrical connection between the signal line connection line and the common electrode line can be adopted simultaneously, or only one of them can be adopted.

Figure 22:
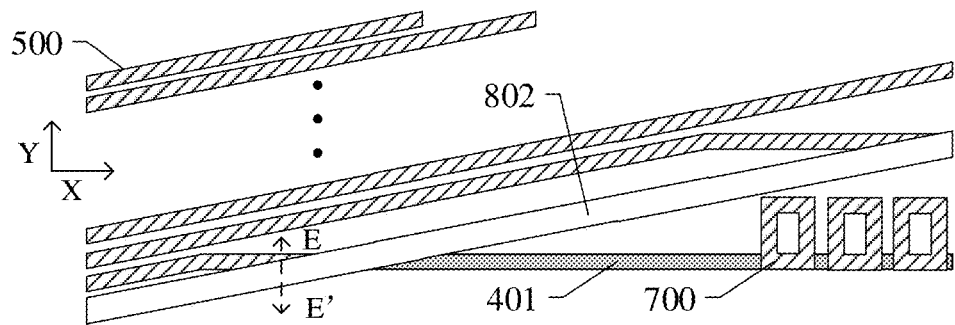
FIG. 22 is a partial schematic view of the display substrate according to another example of the embodiment of the disclosure.
Figure 23:
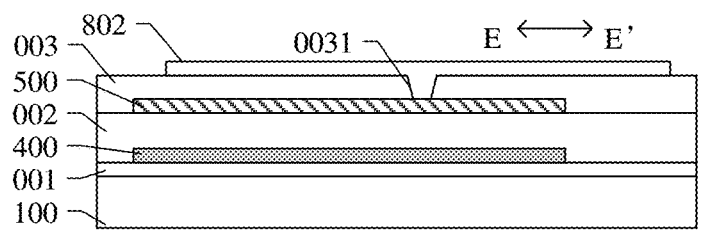
FIG. 23 is a partial schematic view taken by the line EE' as illustrated in FIG. 22.

FIG. 22 is a partial schematic view of the display substrate according to another example of the embodiment of the disclosure, and FIG. 23 is a partial sectional view taken by the line EE' as illustrated in FIG. 22. The display substrate as illustrated in FIG. 22 is different from the display substrates as illustrated in FIGS. 5 to 21 in that the overlapping trace 500 and the common electrode line 802 electrically connected with the overlapping trace 500 are located in different layers. In some examples, as illustrated in FIGS. 22 and 23, a portion of the common electrode line 802 in the second region and the overlapping trace 500 are in different layers, and an insulation layer 003 is disposed between them. The overlapping trace 500 is electrically connected with the portion of the common electrode line 802 through a via hole 0031 located in the insulation layer 003. For example, the common electrode line 802 is located on a side of the overlapping trace 500 away from the base substrate 100. For example, the common electrode line 802 as illustrated in FIG. 23 is in a same layer as the common electrode. For example, both the common electrode line 802 and the common electrode are transparent conductive layers.

For example, in the example, a layer where the overlapping trace 500 is located and a layer where the common electrode line 802 is located can be interchanged. For example, the overlapping trace 500 and the common electrode line 802 are located in a same layer, the common electrode line 802 and the data line are located in a same layer, and the overlapping trace 500 is electrically connected with the common electrode line 802 through a via hole in the insulation layer between the overlapping trace 500 and the common electrode line 802.

For example, in the example, the display substrate can comprise a connection line, as illustrated in FIG. 21. The connection line is located in a layer different from the common electrode line. For example, the connection line, the overlapping trace and the data line are located in a same layer, the common electrode line and the common electrode are located in a same layer, or the connection line, the overlapping trace and the common electrode are located in a same layer, the common electrode line and the data line are located in a same layer, and the connection line is electrically connected with the common electrode line through a via hole located between the connection line and the common electrode line.

For example, in the example, the overlapping trace can be electrically connected with the common electrode line as illustrated in FIG. 22, the overlapping trace can also be electrically connected with the common electrode line by the connection line as illustrated in FIG. 21, or the overlapping trace can be electrically connected with the common electrode line by both the way as illustrated in FIG. 22 and the way of the connection line illustrated in FIG. 21.

Figure 24:
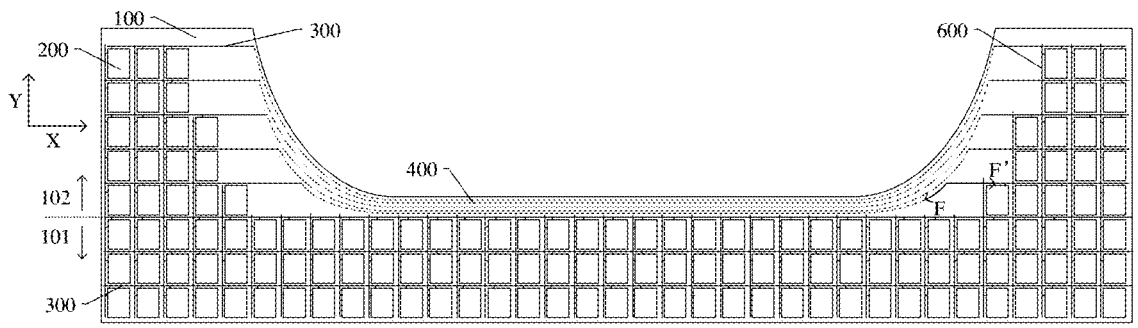
FIG. 24 is a partial schematic plan view of the display substrate according to another example of the embodiment of the disclosure.
Figure 25:
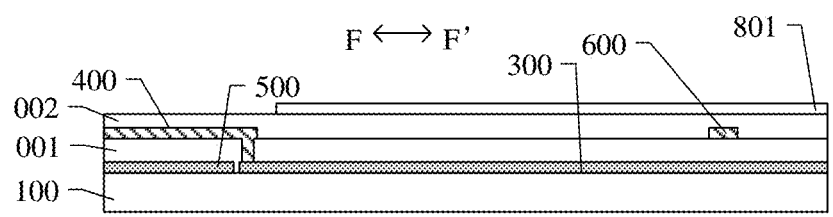
FIGS. 25 to 27 are partial sectional views taken by the line FF' as illustrated in FIG. 24 according to different examples.
Figure 26:
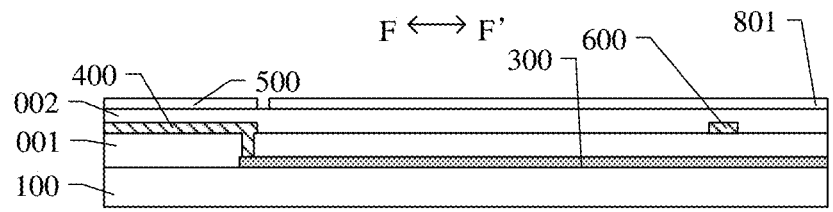
Figure 27:
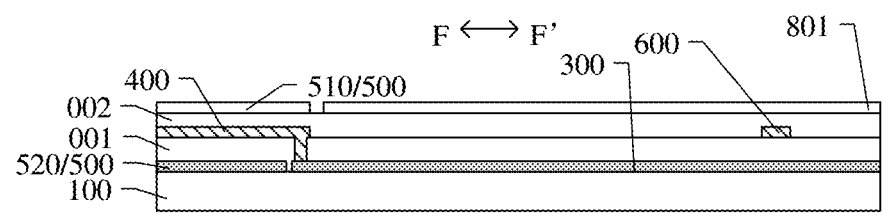

FIG. 24 is a partial schematic plan view of the display substrate according to another example of the embodiment of the disclosure, and FIGS. 25 to 27 are partial sectional views of different examples taken by the line FF' as illustrated in FIG. 24. The display substrate as illustrated in FIG. 24 is different from the display substrate as illustrated in FIG. 5 in that the signal line connection line 400 and the gate line 300 electrically connected with the signal line connection line 400 are located in different layers. The gate line, the sub-pixel, the data line, the capacitance compensation structure, the common electrode and other structures in the example as illustrated in FIG. 24 can have the same technical features as those in the above examples, and will not be repeatedly described herein.

It should be noted that FIG. 24 only illustrates the signal line connection line 400 and does not illustrate the overlapping trace 500, since the signal line connection line overlaps with the overlapping trace.

For example, the signal line connection line 400 is located on a side of the gate line 300 away from the base substrate 100.

In some examples, as illustrated in FIGS. 24 to 26, the signal line connection line 400 is disposed in a same layer as the data line 600. For example, the signal line connection line 400 is electrically connected with the gate line 300 through a via hole in the gate insulation layer 001 between the signal line connection line 400 and the gate line 300. For example, a material of the signal line connection line 400 is the same as a material of the data line 600. FIG. 25 illustrates that the signal line connection line 400 is directly electrically connected with the gate line 300 through a via hole in the gate insulation layer 001 located between the signal line connection line 400 and the gate line 300, and the signal line connection line 400 can also be connected with the gate line by other conductive layers. In this case, the orthographic projection of the signal line connection line 400 on the base substrate is still completely within the orthographic projection of the overlapping trace on the base substrate.

For example, the overlapping trace 500 is located between the signal line connection line 400 and the base substrate 100.

In some examples, as illustrated in FIGS. 24 and 25, the overlapping trace 500 is disposed in a same layer as the gate line 300. For example, a material of the overlapping trace 500 is the same as a material of the gate line 300. For example, the overlapping trace 500 and the gate lines 300 are disposed at interval.

For example, the overlapping trace 500 is disposed in a same layer as the gate line 300, the overlapping trace 500 can be electrically connected with the common electrode line disposed in the same layer as the overlapping trace 500, and the overlapping trace 300 can also be electrically connected with the common electrode line located in the layer where the data line or the common electrode is located.

In some examples, as illustrated in FIGS. 24 and 26, the overlapping trace 500 is located on a side of the signal line connection line 400 away from the base substrate 100. For example, the overlapping trace 500 can be disposed in the same layer as the common electrode 801. For example, a material of the overlapping trace 500 can be the same as a material of the common electrode 801.

For example, in the case that the overlapping trace 500 is disposed in a same layer as the common electrode 801, the overlapping trace 500 can be electrically connected with the common electrode line disposed in the same layer as the overlapping trace 500, and the overlapping trace 300 can also be electrically connected with the common electrode line located in the layer where the data line is located.

In some examples, as illustrated in FIGS. 24 and 27, the overlapping trace 500 comprises a first overlapping trace 510 and a second overlap wiring trace 520 respectively located at both sides of the signal line connection line 400 in the direction perpendicular to the base substrate 100. In the direction perpendicular to the base substrate 100, the first overlapping trace 510 overlaps with the second overlapping trace 520, and an orthographic projection of the signal line connection line 400 on the base substrate 100 is within an orthographic projection of at least one of the first overlapping trace 510 and the second overlapping trace 520 on the base substrate 100.

According to the embodiment of the disclosure, the first overlapping trace and the second overlapping trace, which both overlap with the signal line connection line and are located on both sides of the signal line connection line respectively, are disposed on the display substrate to form a double-layer capacitor parallel structure, so as to maximize the capacitance formed between the signal line connection line and other conductive layers. According to the embodiment of the disclosure, the double-layer overlapping trace is provided, which can further reduce the difference between the RC load on the gate line in the second region and the RC load on the gate line in the first region, for example, the ratio of the RC load on the gate line in the second region to the RC load on the gate line in the first region is larger than 0.9, or larger than 0.92, or 0.95, or 9.98.

In some examples, as illustrated in FIGS. 24 and 27, the signal line connection line 400 is disposed in a same layer as the data line 600, one of the first and second overlapping traces 510 and 520 is disposed in a same layer as the gate line 300, and the other of the first and second overlapping traces 510 and 520 is disposed in the same layer as the common electrode 801.

Figure 28:
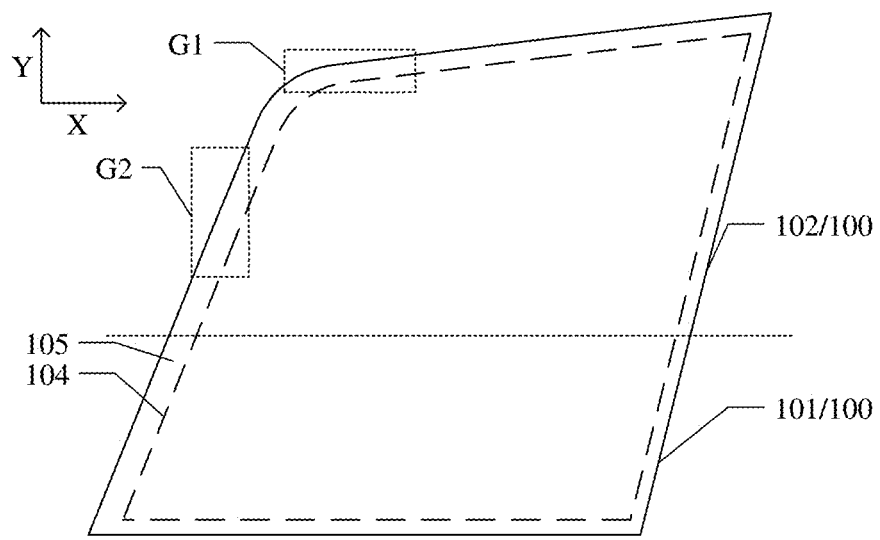
FIG. 28 is a schematic plan view of a display substrate according to another embodiment of the disclosure.
Figure 29:
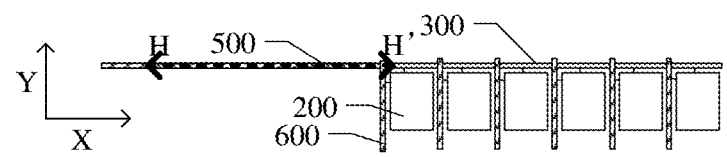
FIG. 29 is a partial structure schematic view of the region G1 as illustrated in FIG. 28.
Figure 30:
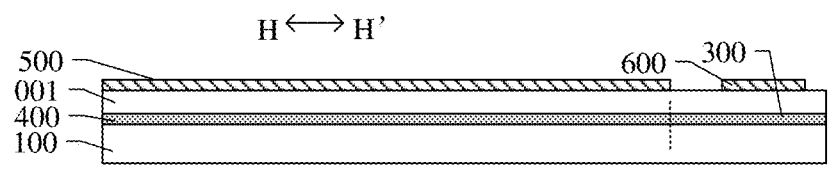
FIG. 30 is a partial schematic view taken by the line HH' as illustrated in FIG. 29.
Figure 31:
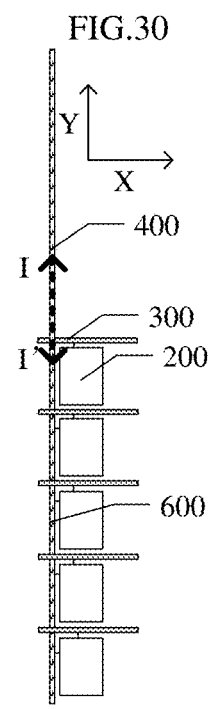
FIG. 31 is a partial structure schematic view of the region G2 as illustrated in FIG. 28.
Figure 32:
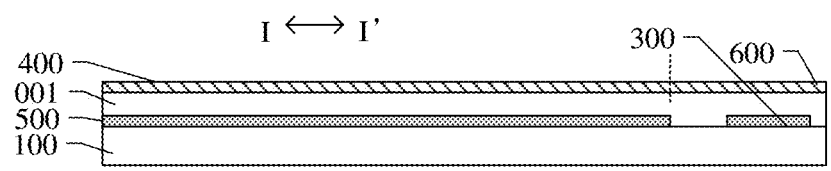
FIG. 32 is a partial schematic view taken by the line II' as illustrated in FIG. 31.

FIG. 28 is a schematic plan view of a display substrate according to another embodiment of the disclosure, FIG. 29 is a partial structure schematic view of the region G1 as illustrated in FIG. 28, FIG. 30 is a partial sectional view taken by the line HH' as illustrated in FIG. 29, FIG. 31 is a partial structure schematic view of the region G2 as illustrated in FIG. 28, and FIG. 32 is a partial sectional view taken by the line II' as illustrated in FIG. 31.

As illustrated in FIGS. 28 to 32, the display substrate comprises a base substrate 100, and a plurality of sub-pixels 200, a plurality of signal lines 300 and a plurality of signal line connection lines 400 located on the base substrate 100. The base substrate 100 comprises a first region 101 and a second region 102 in the periphery of the first region 101.

As illustrated in FIGS. 28 to 32, a plurality of sub-pixels 200 are located in the first region 101 and a second region 102, and a number of sub-pixels 200 arranged in the first region 101 in the first direction is larger than a number of sub-pixels arranged in the second region 102 in the first direction. For example, a number of a row or column of sub-pixels 200 arranged in the first direction in the first region 101 is greater than a number of a row or column of sub-pixels 200 arranged in the first direction in the second region 102.

As illustrated in FIGS. 28 to 32, a plurality of signal lines 300 are located in the first region 101 and the second region 102. Each of the signal lines 300 at least partially extends along the first direction, and each of the signal lines 300 is electrically connected with a row or column of sub-pixels 200 arranged along the first direction.

As illustrated in FIGS. 28 to 32, a plurality of signal line connection lines 400 are located in the second region 102, and the plurality of signal line connection lines 400 are configured to electrically connect with the signal lines 300 located in the second region 102, and each of signal line connection lines 500 at least partially extends in the first direction.

As illustrated in FIGS. 28 to 32, the display substrate further comprises a plurality of overlapping traces 500 located in the second region 102. The plurality of overlapping traces 500 are disposed at intervals and are located in different layers from the plurality of signal line connection lines. An orthographic projection of a signal line connection line 400 on the base substrate 100 is completely within an orthographic projection of an overlapping trace 500 on the base substrate 100.

In the display substrate of the disclosure, the orthographic projection of at least one signal line connection line on the base substrate is completely within the orthographic projection of the overlapping trace on the base substrate, which can increase an overlap area of the signal line connection line and the overlapping trace as much as possible on the premise of satisfying the light transmittance of the metal layer in the display substrate directly opposing to the sealant, so that the resistance-capacitance load (RC load) on the signal line in the second region of the display substrate with special shape can be compensated in maximum to avoid that a low gray scale image is displayed unevenly in the display substrate with special shape as much as possible.

The display substrate illustrated in FIG. 28 is different from the display substrate illustrated in FIG. 5 in the shape of the display region 104. The display region illustrated in FIG. 5 comprises a notch, and the shape of the display region 104 illustrated in FIG. 28 can be similar to a triangle.

For example, the first direction illustrated in FIG. 28 is the X direction, the signal line 300 is the gate line, and a position, where a ratio of RC load on the gate line 300 electrically connected with a row of sub-pixels 200 arranged in the X direction in the second region 102 to RC load on the gate line 300 electrically connected with a row of sub-pixels 200 arranged in the X direction in the first region 101 is substantially 0.85, is taken as the boundary between the first region 101 and the second region 102. Similarly, the first direction illustrated in FIG. 28 is the Y direction, the signal line 300 is the data line, and a position, where a ratio of RC load on the data line electrically connected with a column of sub-pixels 200 arranged in the Y direction in the second region 102 to RC load on the date line electrically connected with a column of sub-pixels 200 arranged in the Y direction in the first region 101 is substantially 0.85, is taken as the boundary between the first region 101 and the second region 102.

For example, as illustrated in FIGS. 28 to 32, the first direction can be the extension direction of the gate line 300 and in this case, the signal line is the gate line 300, the signal line connection line 400 is electrically connected with the gate line 300, and an orthographic projection of the signal line connection line 400 on the base substrate 100 is completely within an orthographic projection of the overlapping trace 500 on the base substrate 100. Alternatively, the first direction can be the extension direction of the data line 600, and in this case the signal line is the data line 600, the signal line connection line 400 is electrically connected with the data line 600, and an orthographic projection of the signal line connection line 400 on the base substrate 100 is completely within an orthographic projection of the overlapping trace 500 on the base substrate 100. Alternatively, the signal line comprises a data line 600 and a gate line 300, the signal line connection line 400 comprises a data line connection line electrically connected with the data line 600 and a gate line connection line electrically connected with the gate line 300, and the overlapping trace 500 comprises a portion overlapping with the data line connection line and a portion overlapping with the gate line connection line.

For example, as illustrated in FIGS. 28 to 32, the signal line connection line 400 is electrically connected with the gate line 300, the signal line connection line 400 is disposed in a same layer as the gate line 300, and the overlapping trace 500 is located on a side of the signal line connection line 400 away from the base substrate 100. For example, the signal line connection line 400 can be an extension line of the gate line 300 and be integrally disposed with the gate line 300.

In the example, the position relationship between the signal line connection line, the gate line and the overlapping trace can be referred to the embodiments illustrated in FIGS. 5 to 27, which will not be repeatedly described herein.

For example, as illustrated in FIGS. 28 to 32, the signal line connection line 400 is electrically connected with the data line 600. For example, the signal line connection line 400 can be disposed in the same layer as the data line 600, and they are an integrated structure. The overlapping trace 500 can be located between the signal line connection line 400 and the base substrate 100, for example, the overlapping trace 500 is located in the same layer as the gate line 300. The overlapping trace 500 can also be located on a side of the signal line connection line 400 away from the base substrate 100, for example, the overlapping trace 500 is located in a same layer as the common electrode. Alternatively, the overlapping trace 500 comprises a double-layer structure located on both sides of the signal line connection line 400 in the direction perpendicular to the base substrate 100 and the overlapping trace 500 is electrically connected with the common electrode line. For example, the overlapping trace 500 and the common electrode line can be in the same layer and are integrally disposed to realize electrical connection; alternatively, the overlapping trace 500 and the common electrode line can be in different layers and realize electrical connection through a via hole in the insulation layer between them. For example, the signal line connection line 400 can be an extension line of the data line 600 and is integrated with the data line 600.

For example, the signal line connection line 400 can be located in different layers from the data line 600, for example, the signal line connection line 400 is located on a side of the data line 600 close to the base substrate 100, for example, the signal line connection line 400 is located on a same layer as the gate line 300. In this case, the overlapping trace 500 is located on a side of the signal line connection line 400 away from the base substrate 100, for example, the overlapping trace 500 can be located in a layer where the data line 600 is located or in a layer where the common electrode is located, or the overlapping trace 500 can comprise two portions, one portion in the layer where the data line 600 is located and one portion in the layer where the common electrode is located.

For example, the signal line connection line 400 can be located in a layer different from the data line 600, for example, the signal line connection line 400 is located on the side of the data line 600 away from the base substrate 100, for example, the signal line connection line 400 is located in the same layer as the common electrode. In this case, the overlapping trace 500 is located on the side of the signal line connection line 400 close to the base substrate 100, for example, the overlapping trace 500 can be located in the layer where the data line 600 is located or in the layer where the gate line is located, or the overlapping trace 500 can comprise two portions, one portion in the layer where the data line 600 is located and one portion in the layer where the gate line is located.

For example, the overlapping trace 500 is electrically connected with the common electrode line.

For example, the capacitance compensation structure 700 in the display substrate illustrated in FIG. 11 can also be disposed in the display substrate illustrated in FIG. 28.

The display substrate according to the embodiment of the disclosure comprises a display region with special shape, and the display region with special shape is not limited to the shape with a notch on the edge as illustrated in FIG. 5 or a triangle as illustrated in FIG. 28, but also can be a circular display region, an arc display area and other special shapes.

An embodiment of the disclosure provides a display device comprising a display substrate illustrated in any of the above examples.

For example, the display device can be a liquid crystal display device.

For example, the display substrate according to the disclosure can be an array substrate, and the display device further comprises an opposing substrate disposed opposing to the array substrate. For example, the opposing substrate can be a color film substrate. For example, a side of the color film substrate facing the array substrate can be disposed with a color film layer corresponding to the pixel unit and a black matrix covering the structures (for example, the gate line and the data line, etc.) located in the non-display region. For example, a liquid crystal layer is disposed between the array substrate and the color film substrate, and the common electrode is configured to apply a common voltage to generate an electric field with the pixel electrode to drive the liquid crystal molecules in the liquid crystal layer to deflect. The liquid crystal molecules deflect to change the transmittance of the liquid crystal layer, thus realizing the display of the desired grey image.

For example, the display device further comprises a first polarizer disposed on a side of the array substrate away from the opposing substrate and a second polarizer disposed on a side of the opposing substrate away from the array substrate. The first polarizer comprises a light transmission axis extending in a first direction and polarizes the backlight incident on the first polarizer in the first direction. The second polarizer comprises a light transmission axis extending in the second direction and polarizes light incident on the second polarizer in the second direction. For example, the transmission axis of the first polarizer and the transmission axis of the second polarizer are perpendicular to each other.

For example, the display device further comprises a backlight located on the non-display side of the display substrate to provide backlight for the display substrate.

For example, in the display device, the notch of the second region can be disposed with functional components, comprising at least one of a camera module (for example, a front camera module), a 3D structured light module (for example, a 3D structured light sensor), a time-of-flight 3D imaging module (for example, a time-of-flight sensor), an infrared sense module (for example, an infrared sensing sensor), etc.

For example, the front camera module is usually enabled when the user takes a selfie or makes a video call, and the pixel display region of the display device displays the image obtained by the selfie for the user to watch. The front camera module comprises, for example, a lens, an image sensor and an image processing chip.

For example, the 3D structured light sensors and Time of Flight (ToF) sensors can be used for face recognition to unlock the display device.

For example, the function component can only comprise the camera module to realize the function of selfie or video call. For example, the function component can further comprise a 3D structured light module or a time-of-flight 3D imaging module to realize face recognition for unlocking, etc. The embodiments include this but are not limited to this.

For example, the display device can be a mobile phone, a tablet computer, a laptop, a navigator and other products or components with display function and with off-screen camera. The embodiments of the disclosure are not limited to this.

Herein, some points need to be explained: (1) drawings of the embodiments of the present disclosure only refer to structures related with the embodiments of the present disclosure, and other structures may refer to general design; (2) in case of no conflict, features in the same embodiment and different embodiments of the present disclosure may be combined with each other.

The foregoing merely are exemplary embodiments of the present disclosure, and not intended to define the scope of the present disclosure, and the scope of the present disclosure is determined by the appended claims.

The invention claimed is:

1. A display substrate, comprising:
   a base substrate, comprising a first region and a second region in the periphery of the first region;
   a plurality of sub-pixels, located in the first region and the second region, wherein a number of the sub-pixels along a first direction in the first region is larger than a number of the sub-pixels along the first direction in the second region;
   a plurality of signal lines, located in the first region and the second region, wherein each of the signal lines at least partially extends along the first direction, and each of the signal lines is electrically connected with a line of the sub-pixels arranged along the first direction;
   a plurality of signal line connection lines, located in the second region, wherein the plurality of signal line connection lines are configured to be electrically connected with the signal lines located in the second region, and each of the signal line connection lines at least partially extends along the first direction,
   wherein the display substrate further comprises a plurality of overlapping traces in the second region, wherein the plurality of overlapping traces are disposed at intervals and are located in a layer different from that of the plurality of signal line connection lines, an orthographic projection of at least one of the plurality of signal line connection lines on the base substrate is completely within an orthographic projection of at least one of the plurality of overlapping traces on the base substrate.

2. The display substrate according to claim 1, wherein the plurality of signal lines comprises at least one of a plurality of gate lines and a plurality of data lines.

3. The display substrate according to claim 1, wherein an extension direction of the overlapping traces is the same as an extension direction of the signal line connection lines, and a line width of the overlapping traces is larger than or equal to a line width of the signal line connection lines.

4. The display substrate according to claim 1, wherein the plurality of overlapping traces are disposed in one-to-one correspondence with the plurality of signal line connection lines, respectively, an orthographic projection of each of the signal line connection lines on the base substrate is completely within an orthographic projection of the overlapping trace disposed correspondingly on the base substrate, and an interval between adjacent overlapping traces is not less than 1.5 micrometers.

5. The display substrate according to claim 1, wherein the signal line connection lines are disposed in a same layer as the signal lines electrically connected thereto.

6. The display substrate according to claim 5, wherein the overlapping traces are located on a side of the signal line connection lines away from the base substrate.

7. The display substrate according to claim 5, wherein the plurality of signal lines comprises a plurality of gate lines, and the display substrate further comprises:
a plurality of data lines, located on a side of the plurality of gate lines away from the base substrate, and each of the data lines at least partially extends along a second direction, and the second direction intersects with the first direction,
wherein, along a direction perpendicular to the base substrate, the data lines do not overlap with the signal line connection lines,
the overlapping traces are disposed in a same layer as the data lines; or, the overlapping traces are located on a side of the data lines away from the base substrate.

8. The display substrate according to claim 1, wherein the signal line connection lines are disposed in a layer different from that of the signal lines electrically connected thereto,
wherein the plurality of signal lines comprises a plurality of gate lines, and the display substrate further comprises:
a plurality of data lines, located on a side of the plurality of gate lines away from the base substrate, and each of the data lines at least partially extends along a second direction, and the second direction intersects with the first direction,
wherein, along a direction perpendicular to the base substrate, the data lines do not overlap with the signal line connection lines, and the signal line connection lines are disposed in a same layer as the data lines.

9. The display substrate according to claim 8, wherein the overlapping traces are located in a same layer as the gate lines, or the overlapping traces are located on a side of the signal line connection lines away from the base substrate.

10. The display substrate according to claim 9, wherein the plurality of signal lines comprises a plurality of gate lines, and the display substrate further comprises:
a plurality of data lines, located on a side of the plurality of gate lines away from the base substrate, and each of the data lines at least partially extends along the second direction, and the second direction intersects with the first direction,
wherein the sub-pixel comprises a common electrode, located on a side of the data lines away from the base substrate, along a direction perpendicular to the base substrate, the data lines do not overlap with the signal line connection lines, the signa line connection lines are disposed in a same layer as the data lines, one of a first overlapping trace and a second overlapping trace is located in a same layer as the gate lines, and another of the first overlapping trace and the second overlapping trace is located in a same layer as the common electrode.

11. The display substrate according to claim 1, wherein the signal line connection lines are disposed in a layer different from that of the signal lines electrically connected thereto,
wherein the overlapping traces comprise a first overlapping trace and a second overlapping trace respectively located on both sides of the signal line connection lines in a direction perpendicular to the base substrate; in the direction perpendicular to the base substrate, the first overlapping trace overlaps with the second overlapping trace, and an orthographic projection of the signal line connection lines on the base substrate is located within an orthographic projection of at least one of the first overlapping trace and the second overlapping trace on the base substrate.

12. The display substrate according to claim 1, wherein the display substrate comprises a display region and a non-display region, the second region comprises a portion of the display region and a portion of the non-display region, and the signal line connection lines are at least partially located in the non-display region.

13. The display substrate according to claim 12, wherein the signal line connection line is electrically connected with the signal line located at least one side of the signal line connection line in the first direction, at least one capacitance compensation structure is disposed between the signal line connection line and the signal line electrically connected thereto, the capacitance compensation structure is located in the non-display region, and the capacitance compensation structure is electrically connected with both of the signal line and the signal line connection line respectively located on both sides of the capacitance compensation structure.

14. The display substrate according to claim 13, wherein the plurality of signal lines comprises a plurality of gate lines, and the display substrate further comprises: a plurality of data lines, located on a side of the plurality of gate lines away from the base substrate, and each of the data lines at least partially extends along a second direction, and the second direction intersects with the first direction,
the sub-pixel comprises a common electrode, located on a side of the data lines away from the base substrate,
in the first region, a value of capacitance generated by the gate line electrically connected with a row of sub-pixels and the data line and the common electrode which overlap with the gate line is a first capacitance value; in the second region, a sum value of a capacitance generated by the gate line electrically connected with a row of sub-pixels and the data line and the common electrode which overlap with the gate line, and a capacitance generated by a signal line connection line electrically connected with the gate line and the overlapping trace which overlap with the signal line connection line, and a capacitance of the capacitance compensation structure is a second capacitance value, and a ratio of the second capacitance value to the first capacitance value is from 0.85 to 1.

15. The display substrate according to claim 13, wherein the non-display region in the second region comprises a first sub-region and a second sub-region, the second sub-region is located between the first sub-region and the display region, the signal line connection line is located in the first sub-region, and the capacitance compensation structure is located in the second sub-region.

16. The display substrate according to claim 12, wherein the sub-pixel comprises a common electrode located on a side of the signal line away from the base substrate,
wherein the display substrate further comprises a common electrode line located on the base substrate, the common electrode line is configured to be electrically connected with the common electrode, and the common electrode line is electrically connected with the overlapping trace.

17. The display substrate according to claim 16, wherein a portion of the common electrode line located in the second region is disposed in a same layer as the overlapping trace, and the portion of the common electrode line is located between the overlapping trace and the display region, and the overlapping trace is integrally disposed with the portion of the common electrode line.

18. The display substrate according to claim 16, wherein a portion of the common electrode line located in the second region and the overlapping trace are located in different layers, and an insulation layer is disposed between the portion of the common electrode line and the overlapping trace, and the overlapping trace is electrically connected with the portion of the common electrode line through a via hole located in the insulation layer.

19. The display substrate according to claim 16, further comprising:
- a connection line, an extension direction of which intersecting with an extension direction of the overlapping trace;
- wherein the connection line is configured to electrically connect the overlapping trace with the portion of the common electrode line located in the second region;
- the connection line is disposed in a same layer with the overlapping trace.

20. The display substrate according to claim 12, wherein the display region in the second region comprises two sub-display regions arranged along the first direction, and an interval is disposed between the two sub-display regions so that an edge of the second region away from the first region forms a notch; the display substrate comprises a sealing region located in the non-display region, and the sealing region is configured to be disposed with a sealant;
- the signal line connection line comprises a portion located between the two sub-display regions and located in the sealing region, and the signal line connection line is configured to connect the signal lines located in the two sub-display regions respectively,
- wherein the at least one signal line connection line extends along at least a portion of an edge of the notch.

* * * * *